(12) United States Patent
Sugiura et al.

(10) Patent No.: US 7,283,736 B2
(45) Date of Patent: Oct. 16, 2007

(54) IMAGING APPARATUS AND IMAGING METHOD

(75) Inventors: Koichi Sugiura, Ohta-ku (JP); Kei Itoh, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 251 days.

(21) Appl. No.: 11/034,832

(22) Filed: Jan. 14, 2005

(65) Prior Publication Data

US 2005/0185946 A1 Aug. 25, 2005

(30) Foreign Application Priority Data

Jan. 15, 2004 (JP) ............................ 2004-007576
Feb. 12, 2004 (JP) ............................ 2004-035168
Dec. 15, 2004 (JP) ............................ 2004-362314
Dec. 15, 2004 (JP) ............................ 2004-363011

(51) Int. Cl.
G03B 13/00 (2006.01)

(52) U.S. Cl. .................. 396/104; 396/106; 396/123

(58) Field of Classification Search ................ 396/104, 396/80, 98, 106, 121, 123, 543; 250/201.7; 348/345, 348

See application file for complete search history.

(56) References Cited

U.S. PATENT DOCUMENTS

| 4,536,072 A | * | 8/1985 | Taniguchi et al. | ........... 396/104 |
| 5,784,654 A | * | 7/1998 | Saito et al. | ................. 396/104 |
| 5,825,016 A | * | 10/1998 | Nagahata et al. | ........ 250/201.8 |
| 2004/0263633 A1 | | 12/2004 | Shinohara et al. | ..... 348/207.99 |

FOREIGN PATENT DOCUMENTS

| JP | 5-34577 | 2/1993 |
| JP | 7-22648 | 5/1995 |
| JP | 8-334681 | 12/1996 |
| JP | 2691206 | 9/1997 |
| JP | 2709375 | 10/1997 |
| JP | 10-319481 | 12/1998 |
| JP | 2000-235224 | 8/2000 |
| JP | 2000-292680 | 10/2000 |
| JP | 2001-5064 | 1/2001 |
| JP | 2001-166353 | 6/2001 |
| JP | 3300961 | 4/2002 |
| JP | 2002-207236 | 7/2002 |

(Continued)

Primary Examiner—W. B. Perkey
Assistant Examiner—Rishi Suthar
(74) Attorney, Agent, or Firm—Oblon, Spivak, McClelland, Maier & Neustadt, P.C.

(57) ABSTRACT

An imaging apparatus including a ranging device for measuring a distance to a subject, a device for radiating fill-light to the subject, and a re-ranging determining device for determining as to whether re-measurement is executed based on a measured result of the ranging device, when the re-ranging determining device determines that the re-measurement by the ranging device is required, the fill-light radiating device radiating the fill light to the subject based on the determination of the re-ranging determining device, the ranging device having a ranging element mechanism for allowing a light flux from the subject to image thereon to measure the distance to the subject, a ranging arithmetical mechanism for achieving an arithmetic of the ranging based on outputting data of the ranging element mechanism, and an area selecting mechanism for selecting an area based on an arithmetical result of the ranging arithmetical mechanism.

36 Claims, 13 Drawing Sheets

FOREIGN PATENT DOCUMENTS

| | | |
|---|---|---|
| JP | 2002-268126 | 9/2002 |
| JP | 2003-241069 | 8/2003 |
| JP | 2003-280060 | 10/2003 |
| JP | 2004-62058 | 2/2004 |
| JP | 2004-85964 | 3/2004 |
| JP | 2004-151183 | 5/2004 |
| JP | 2004-151628 | 5/2004 |

* cited by examiner

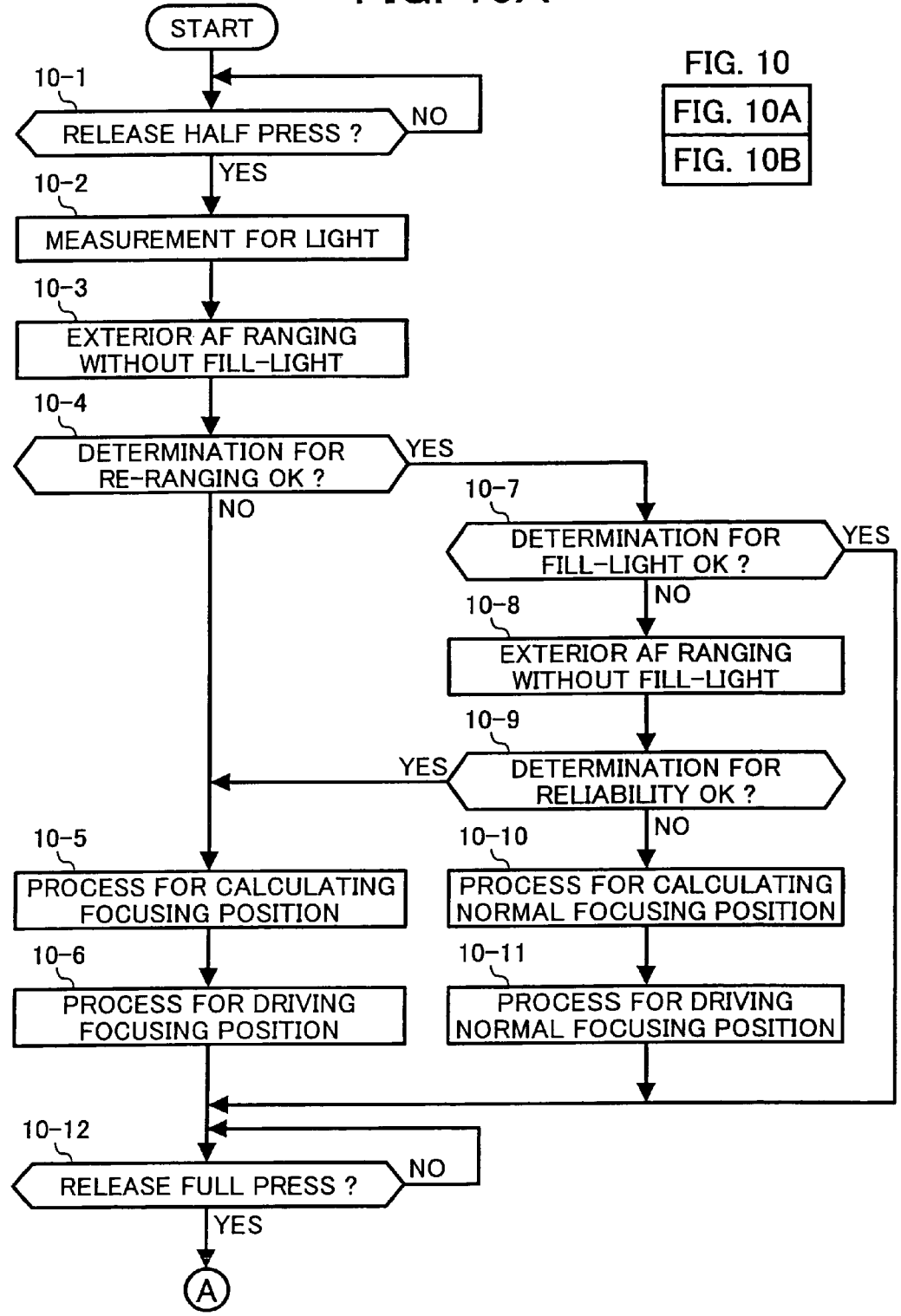

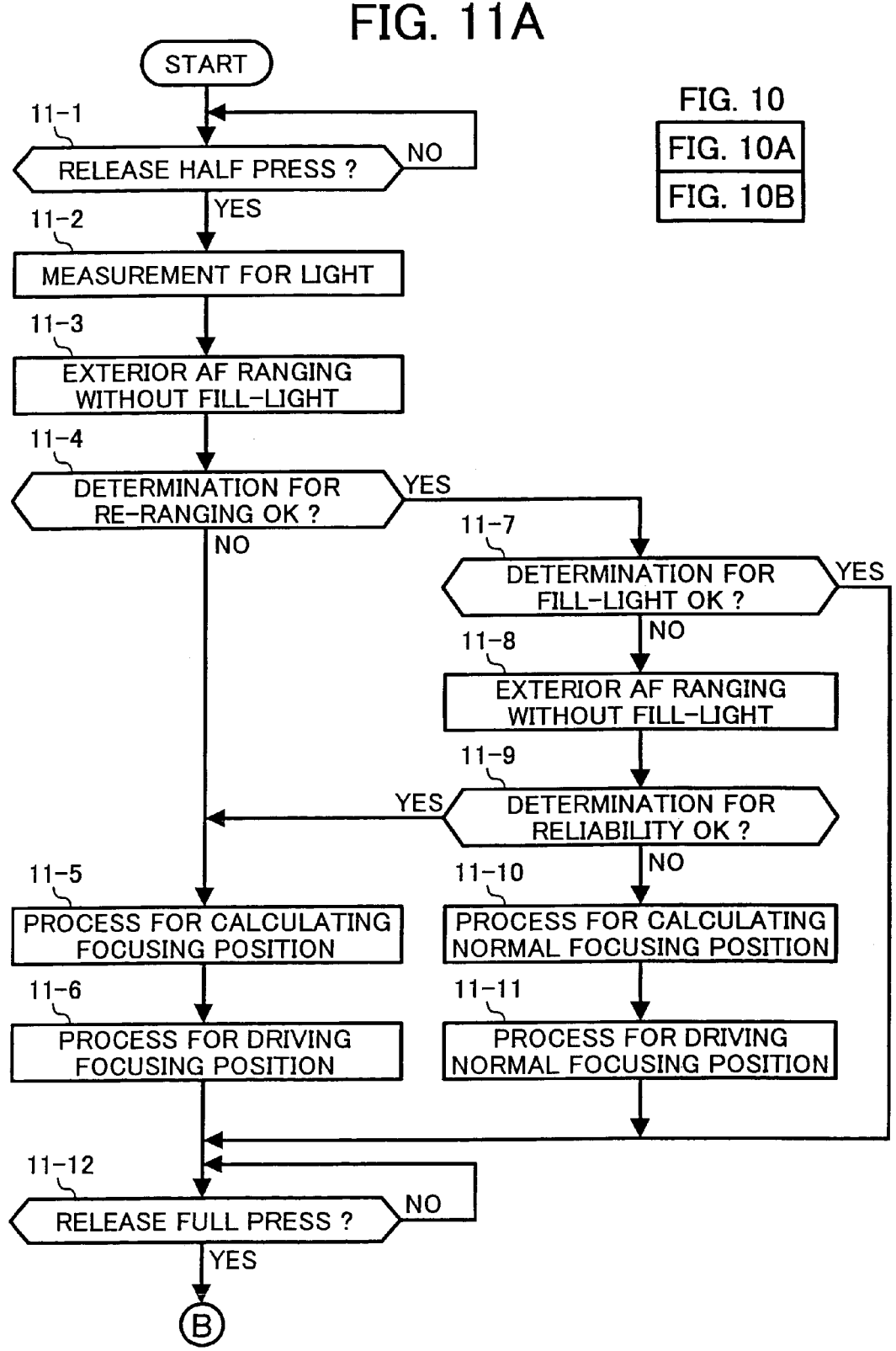

IMAGING APPARATUS AND IMAGING METHOD

CROSS-REFERENCE TO THE RELATED APPLICATIONS

The application claims the priority benefit of each of Japanese Patent Application Nos. 2004-007576 filed on Jan. 15, 2004, 2004-035168 filed on Feb. 12, 2004, 2004-362314 filed on Dec. 15, 2004 and 2004-363011 filed on Dec. 15, 2004, the entire descriptions of which are incorporated herein by reference.

BACKGROUND OF THE INVENTION

1. Field of the Invention

The present invention relates to an imaging apparatus and an imaging method of a passive type applicable to an automatic focusing device being used for a digital camera, a silver salt camera and the other usual cameras.

2. Description of Related Art

Conventionally, there has been proposed a structure capable of measuring easily and accurately a distance to a subject having a shape including a various of contrast edges in an imaging apparatus having a passive type ranging device. The structure includes a plurality of arrays of photoelectric conversion elements disposed upward and downward respectively to a pair of images of the subject, a part for preparing image information for processing image information converted photo-electrically by a plurality of up and down array groups of the photoelectric conversion elements preparing image information in the same direction as a deviated direction in the same portions of the subject, and an image-deviation detecting part for detecting a deviated amount of optical images in the sane portions of the subject based on a pair of right and left image information prepared as described above (for reference, see Japanese Patent Laid-Open No. H8-334681).

In a ranging apparatus or imaging apparatus using fill-light radiating to a subject, there has been proposed a structure using a flash device for flash photograph as a source of fill-light to be capable of using flashing light as fill-light for an auto focus. In the structure, a camera controlling part determines that focus detection is not possible when a brightness of the subject or contrast is low as a result of measurement of light by a light measuring part, at this time, a built-in flash or exterior flash is emitted, and the light is used as the fill-light for an auto-focus ranging (for reference, see Japanese Patent Laid-Open No. H5-34577).

In a camera having an auto-focus (AF) adjusting device, if a difference of brightness between a subject and a background is large as in backlight or the like, there is possibility that erroneous focusing occurs by measuring the background. The erroneous focusing is not considered in Japanese Patent Laid-Open No. H8-334681 as described above.

On the other hand, in Japanese Patent Laid-Open No. H5-34577, if a subject has a low brightness or low contrast as a result of measurement of brightness of the subject, a strobe for flash photograph is emitted at the time of a ranging to use as fill-light when measuring a distance to the subject. However, if a brightness difference between the subject and a background is large, because the background has a high brightness, there is possibility that the fill-light is not emitted. In this way, the invention disclosed in the patent document has the same problem as in Japanese Patent Laid-Open No. H8-334681.

Causes of the problems in prior art as described above are that the ranging is impossible relating to areas corresponding to the low brightness of the subject, whereas, is possible relating to areas corresponding to the high brightness of the background, as a result, a ranging value in an area of the background is selected, therefore the erroneous focusing occurs. Consequently, there are requested measures to improve a state of low brightness of the subject by any methods, under circumstances generating the brightness difference between the subject and the background.

On the other hand, in a two step SW type release operation in a conventional auto-focusing camera, usually, a sequence is taken that AF (ranging), display of an AF result, and focusing are executed in a half-press (first step), and exposure, namely, shutter control is executed in a full-press (second step). In addition, in case of a camera with fill-light function, the fill-light is emitted simultaneously with an AF operation in the half-press of the release. However, if the fill-light is emitted simultaneously with the AF operation in the half-press of the release, if a subject photographed is a person, there is a problem that the person misunderstands that the photograph has been taken when emitting the fill-light in the half-press. In particular, this tendency is higher in case of using the strobe as the fill-light. Because the fill-light is emitted every the release is half-pressed in these cameras, there is a problem that an operating life of a battery becomes short and so on.

In addition, there have been known an auto-focus camera disclosed in Japanese Utility Model Laid-Open No. H7-22648 as a conventional art for driving a photographic lens in a position by measuring automatically a distance to a subject when operating a release or shutter, an illuminating device for photograph disclosed in Japanese Patent Laid-Open No. 2002-207236 as a conventional art for adjusting an emitted amount of light according to a distance to a subject, an auxiliary illuminating device for an auto-focusing camera disclosed in Japanese Patent No. 2691206 as a conventional art for carrying out a detection of focusing by radiation of light of the auxiliary illuminating device, and an auto-focusing camera disclosed in Japanese Patent No. 2709375 as a conventional auto-focusing camera having a flashing device projecting fill-light to a subject.

SUMMARY OF THE INVENTION

The present invention has been made in view of the above problems in the prior art as described above and a first object thereof is to provide an imaging apparatus and an imaging method capable of obtaining more accurate ranging data, by first determining effectiveness of a ranging value in circumstances in which an erroneous focusing occurs when a circumference of a subject has a low brightness or a brightness difference is large such as backlight, and if the effectiveness is low, then by radiating fill-light to the subject or resetting a charge-storage time to carry out re-ranging, therefore increasing focusing accuracy by re-setting and re-measuring or re-ranging.

Moreover, a second object of the present invention is to provide an imaging device in which if fill-light is emitted simultaneously with an AF operation when half-pressing a release, a person who is photographed is prevented from misunderstanding such that the photograph has been taken when emitting the fill-light, and a buttery has a long operating life.

To accomplish the first object, the imaging apparatus according to the present invention comprises a ranging device for measuring a distance to a subject, a device for radiating fill light to the subject, and a re-ranging determining device for determining as to whether re-ranging is executed based on a measured result of the ranging device.

When the re-ranging determining device determines that the re-measurement by the ranging device is required, the fill-light radiating device radiates the fill light to the subject based on the determination of the re-ranging determining device.

Moreover, an imaging method according to the present invention comprises a process for storing charge to image a light flux from a subject on at least a pair of charge-storage type light receiving element arrays settable a plurality of areas, a process for achieving a ranging arithmetic based on an output of each area of the light receiving element arrays, a process for selecting an area based on a measured result by the ranging arithmetical process, a process for determining whether a re-ranging is required in comparison a ranging arithmetical result of the area selected by the area selecting process with each ranging arithmetical result of the other areas, and a process for radiating fill light to the subject.

The fill light is radiated to the subject by the fill-light radiating process, during storing the charge in the charge storing process, when it is determined that the re-ranging is required in the re-ranging determining process and when achieving the re-ranging.

To accomplish the second object, an imaging apparatus according to the present invention comprises a photographic operating device including two-step operational positions having at least a half-pressed position and a full-pressed position, a ranging device for measuring a distance to a subject, a fill-light radiating device for radiating fill light to the subject, a focus-adjustment controlling device for controlling adjustment of a focus based on a measured result of the ranging device, an exposure controlling device for controlling an exposure, and a fill-light determining device for determining whether the fill light is required.

When the photographic operating device is in the half-pressed position and the fill-light determining device determines that the fill light is required, the focus-adjustment controlling device does not adjust the focusing.

When the photographic operating device is in the full-pressed position, the fill-light radiating device radiates the fill light to the subject and the re-ranging is achieved by means of the ranging device.

The focus-adjustment controlling device computes a focus adjusting position based on a result of the re-ranging, and the exposure is achieved by means of the exposure-controlling device after the focus adjustment is controlled by means of the focus-adjustment controlling device based on the focus adjusting position.

BRIEF DESCRIPTION OF THE DRAWINGS

FIG. 16 B is a graph showing a difference between right and left images in the ranging device.

DETAILED DESCRIPTION OF THE PREFERRED EMBODIMENTS

Preferred embodiments of an imaging apparatus and an imaging method according to the present invention will be explained in detail with reference to the accompanying drawings below.

Figure 1:
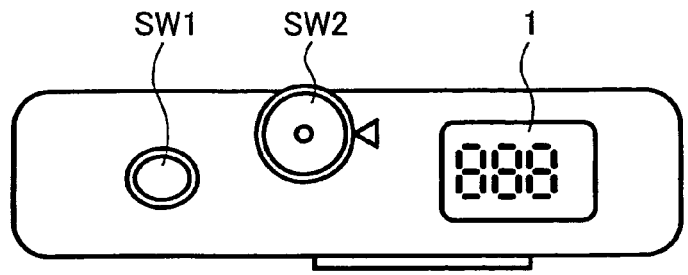
FIG. 1 is a plan view of an exterior appearance showing an example of a digital camera in which an imaging apparatus according to the present invention is installed.
Figure 2:
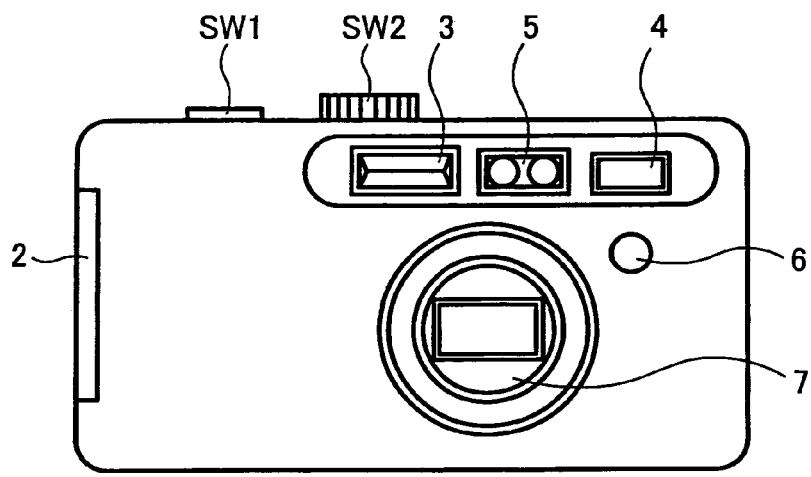
FIG. 2 is a front view of the exterior appearance of the digital camera shown in FIG. 1.

An embodiment in which the imaging apparatus according to the present invention is applied to a digital camera is illustrated in FIG. 1. The digital camera is provided at an upper surface thereof with a release shutter or release button SW1, a mode dial SW2 and a sub liquid crystal display (sub LCD) 1, as shown in FIGS. 1 to 3.

The digital camera is also provided at a front surface thereof with a cover 2 for a storage for containing a memory card, for example, an SD type card and a power buttery, a strobe-light emitting part 3, an optical finder 4, a ranging device 5, which will be described hereinafter, a remote controlling light-receiving part 6 and a lens barrel unit 7, as shown in FIG. 1.

Figure 3:
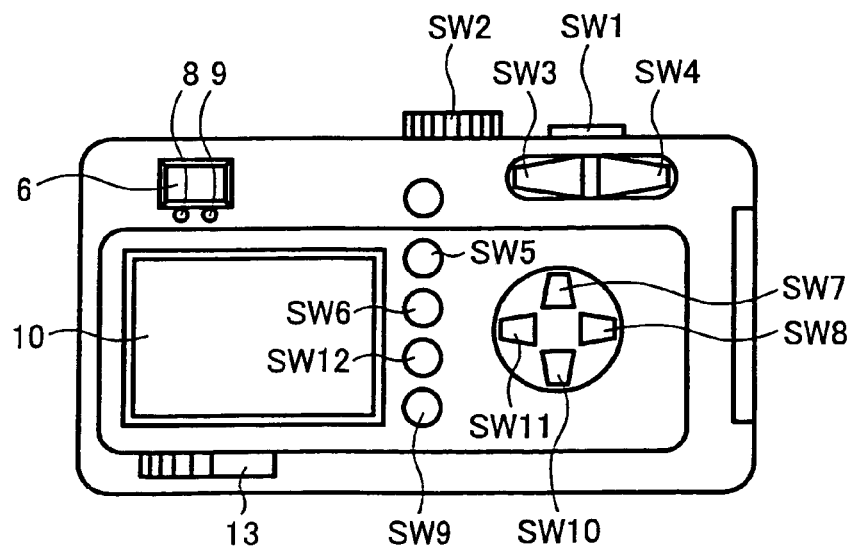
FIG. 3 is a rear view of the exterior appearance of the digital camera shown in FIG. 1.

The digital camera is further provided at a rear surface thereof with an AF (auto focus) and LED (light emitting diode) 8 for radiating a light beam toward the subject to adjust a auto-focusing, a strobe-LED 9 to display an operation of strobe, a monitor, for example, an LCD monitor 10 comprising a liquid crystal display, a zoom switch (wide) SW3, a zoom switch (far and near) SW4, a self timer/deleting switch SW 5 and a menu switch SW6, as shown in FIG. 3. In addition, an upper strobe switch SW7, a right switch SW8, a display switch SW9, a lower/micro switch SW10, a left/image confirming switch 11, an OK switch SW12, and a power switch SW13 are disposed on the rear surface of the digital camera.

Figure 12:
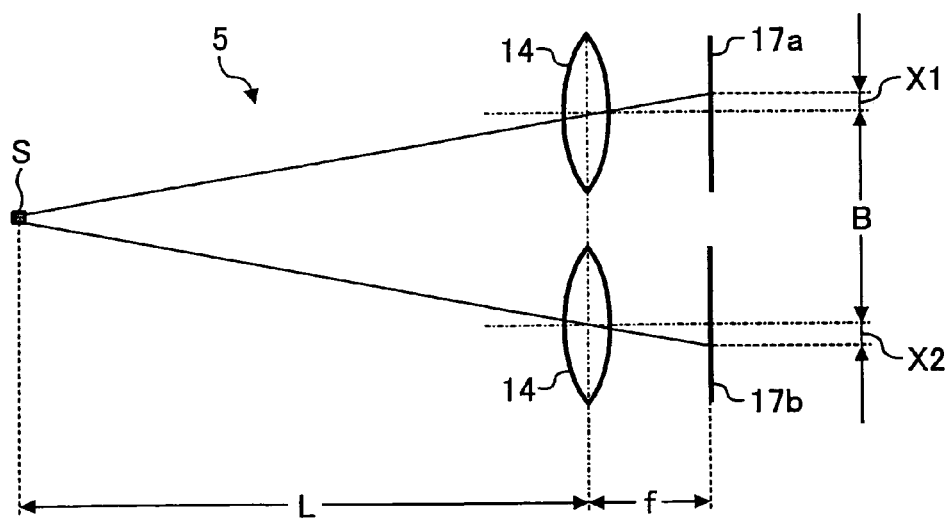
FIG. 12 is a schematic plan view of the ranging device.
Figure 13:
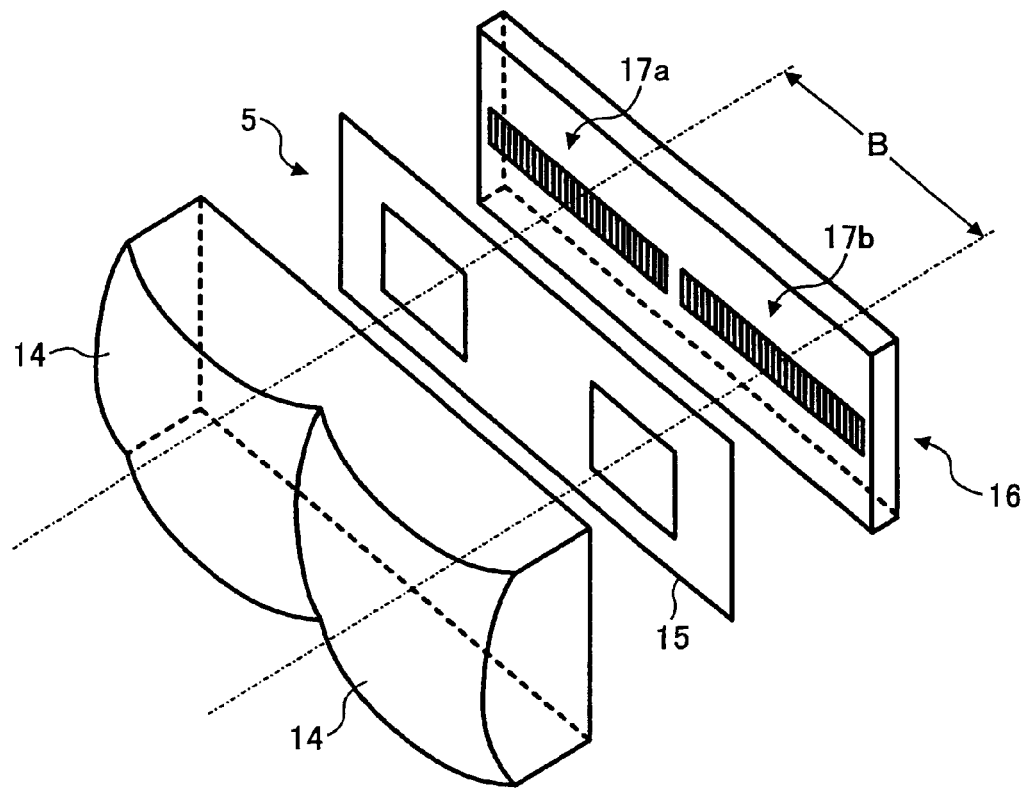
FIG. 13 is a schematic perspective view of the ranging device.

In a first embodiment of a digital camera in which the imaging apparatus according to the present invention is applied, the digital camera comprises the above-mentioned ranging device 5 for measuring a distance to a subject S, as shown in FIGS. 12 and 13, a device for radiating fill light to the subject, and a re-ranging determining device for determining as to whether re-measurement is executed based on a measured result of the ranging device 5. The ranging device 5, the fill-light radiating device and the re-ranging determining device are controlled mutually by means of a CPU (not shown) installed in the digital camera. This control will be described in detail hereinafter.

The ranging device 5 is referred to as a ranging unit or an exterior AF unit in the specification. The fill-light radiating device includes the above-mentioned strobe-light emitting part 3, an LED, a lamp or the like in an embodiment. The re-ranging determining device includes a program installed in the CPU.

Next, a principle of the ranging device 5 will be explained with reference to FIGS. 12 to 16B.

The ranging device 5 generally comprises right and left lenses 14, aperture stops 15 disposed corresponding to each of the lenses 14, and a ranging element mechanism 16, which measures a distance to the subject by imaging a light flux from the subject, as shown in FIGS. 12 and 13. The ranging device 5 also includes a ranging arithmetical mechanism for computing a ranging based on outputting data of the ranging element mechanism 16, an area selecting mechanism for selecting an area based on an arithmetical result of the ranging arithmetical mechanism. The ranging element mechanism 16 has at least a pair of right and left light receiving sensors 17a and 17b for receiving light from the subject S, each of which has a plurality of light receiving areas 18 arranged in line. Each of the plurality of light receiving areas 18 is a charge storage-type capable of imaging the light flux from the subject S (see FIG. 14). Each light receiving area has a plurality of light receiving elements, which will be described hereinafter. Moreover, the ranging element mechanism 16 includes a program to control reading out of the charge storage or an amount of received light of each light receiving sensor. The ranging arithmetical mechanism and the area selecting mechanism include programs in the CPU.

The lenses 14 allow light from the subject to image on the light receiving sensors 17a and 17b, and the aperture stops 15 limit an amount of light entering into the light receiving sensors.

Figure 14:
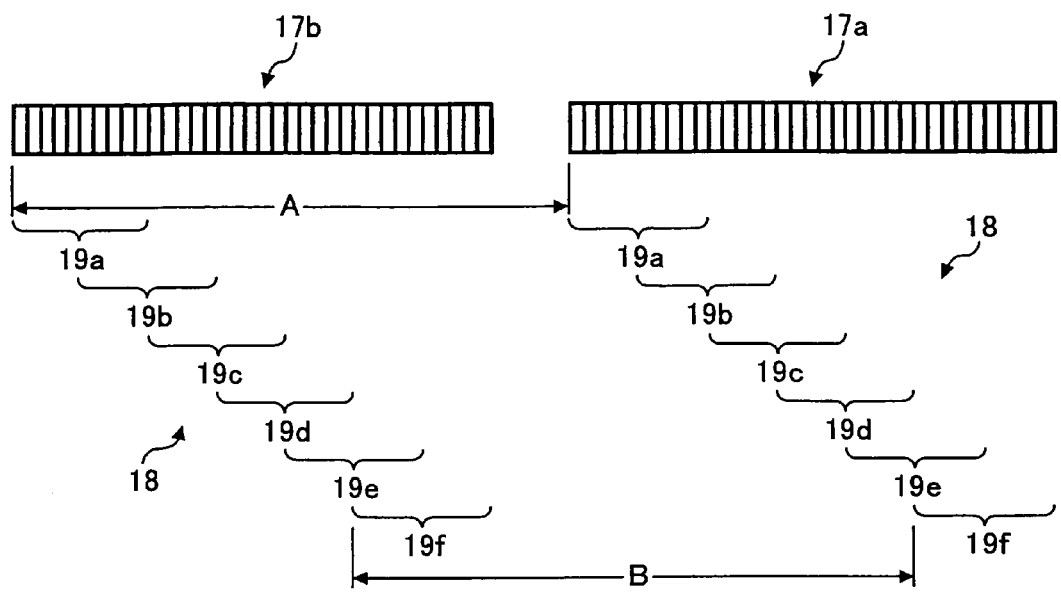
FIG. 14 is a schematic view showing a ranging element mechanism in the ranging device.

The right light receiving sensor 17a and the left light receiving sensor 17b have first to sixth light receiving areas 19a to 19f, respectively, in an embodiment shown in FIG. 14. Meanwhile, A denotes a distance between the right and left light receiving sensors, in FIG. 14, and B a distance between the areas in the right and left light receiving sensors, respectively, in FIGS. 13 and 14.

Figure 15A:
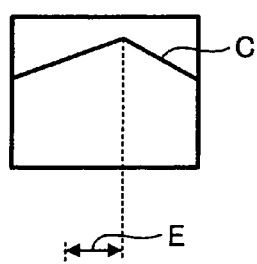
FIGS. 15A and 15B are graphs showing light receiving data of light receiving areas in the ranging device.
Figure 15B:
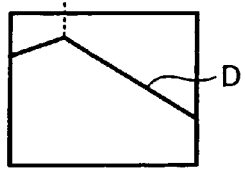
Figure 16A:
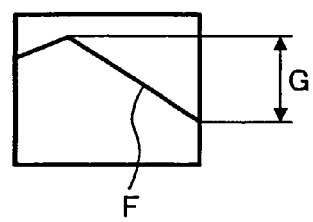
FIG. 16 A is a graph showing a determined value of a contrast in the ranging device.
Figure 16B:
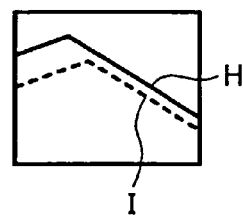

FIG. 15 illustrates light receiving data C of the right light receiving sensor 17a, FIG. 15B illustrates light receiving data D of the left light receiving sensor 17b. In FIGS. 15A and 15B, a vertical axis shows a magnitude of the light receiving data and a horizontal axis shows a position of each light receiving element in each light receiving area. In addition, E denotes a deviation, X1+X2 of the light receiving data between the right and left light receiving sensors. FIG. 16A illustrates a determined value G of contrast to determine whether a difference between the maximum and minimum values of the light receiving data is more than a rated value, FIG. 16B illustrates values of right and left images, in which H denotes light receiving data of the right sensor 17a, and I denotes light receiving data of the left sensor 17b. In addition, in FIGS. 16A and 16B, a vertical axis shows a magnitude of the light receiving data and a horizontal axis shows a position of each of the light receiving elements within the light receiving areas.

In the above-mentioned ranging device, assuming that a distance from the subject S to the lenses 14 is L, a distance between each of the lenses 14 and each of the light receiving sensors 17a and 17b is f, a space between the right and left light receiving sensors is B, and deviated amounts among lights through the right and left light receiving sensors and optical axes of parallel lights (lights from infinity) are X1 and X2, respectively, the distance L from a central position perpendicular to an optical axis of each of the lenses 14 to the subject is computed by the following formula based on a triangular ranging method.

$$L = B \times f/(X1+X2)$$

Because the space B between the light receiving sensors, and the distance f between each lens and each light receiving sensor are predetermined, the distance L to the subject can be computed by use of the above-mentioned formula by reading out the light receiving amount of the light receiving sensors and the (X1+X2) by the CPU, respectively.

More specifically, the light receiving sensors 17a and 17b have a plurality of light receiving elements, which have mutually equal numbers. One light receiving area is formed by including a predetermined number of light received elements, and the right and left light receiving sensors have the plurality of light receiving areas as described above. The light receiving elements included in each light receiving area may be overlapped with that in the other light receiving areas. For example, the right and left light receiving sensors are composed of the one hundred thirty (130) light receiving elements, respectively. If one light receiving area is formed from the thirty (30) light receiving elements, a light receiving area No. 1 comprises the light receiving elements of first to thirtieth from the left end of the sensors, a light receiving area No. 2 comprises the light receiving elements of twentieth to fiftieth, a light receiving area No. 3 comprises the light receiving elements of fortieth to seventieth, a light receiving area No. 4 comprises the light receiving elements of sixtieth to ninetieth, a light receiving area No, 5 comprises the light receiving elements of eightieth to one hundred tenth, a light receiving area No. 6 comprises the light receiving elements of ninetieth to one hundred thirtieth. In this case, the ten light receiving elements from the left end of each light receiving area are overlapped with the others.

The (X1+X2) is obtained by detecting how shapes of the light receiving data deviate, comparing the shapes of the light receiving data of the right and left corresponding light receiving areas, as shown in FIGS. 15A and 15B. As shown in FIG. 16A, if a difference between the maximum and minimum values of the light receiving data within the light receiving areas is less than a rated value, a contrast determination is judged as NG. Whether both the corresponding right and left light receiving areas are more than the rated value are judged. The receiving data of the right and left light receiving areas should be ideally the same shape in a direction of the vertical axis. However, there is a case that the shape is different in the direction of the vertical axis as a condition of light in the subject. Therefore, the determination of a difference between right and left images is executed by comparing the sum of the amount of light that all the light receiving elements in the light receiving areas receive, in the right and left light receiving sensors.

An area surrounded by a straight line H showing the sum of the amount of light received in the right light receiving sensor in FIG. 16B, and a broken line I showing the sum of the amount of light received in the left light receiving sensor shows a difference of the sum of the amount of light received in the right and left light receiving sensors. If this value is more than a predetermined value, determination of the difference between the right and left images is NG.

Here, when the re-ranging determining device determines that the re-ranging is required by means of the ranging device, based on the determination, the fill-light radiating device is configured to radiate the fill light to the subject.

In a second embodiment of a digital camera to which the imaging apparatus according to the present invention is applied, the camera comprises a photographic operating device including two-step operational positions having at least a half-pressed position and a full-pressed position, a ranging device for measuring a distance to a subject, a fill-light radiating device for radiating fill light to the subject, a focus-adjustment controlling device for controlling adjustment of a focus based on a measured result of the ranging device, an exposure controlling device for controlling an exposure, and a fill-light determining device for determining whether the fill light is required. Here, the photographic operating device includes a release shutter SW1 in the embodiment The ranging device and the fill-light radiating device in the second embodiment are the same as in the first embodiment as described above, in structure. The focus-adjustment controlling device for adjusting the focusing, the exposure controlling device and the fill-light determining device include programs installed in the CPU in the embodiment. Moreover, the devices as described above are mutually controlled by means of the CPU, A detail thereof will be described hereinafter.

In the embodiment, when the photographic operating device is in the half-pressed position and the fill-light determining device determines that the fill light is required, the focus-adjustment controlling device does not adjust the focusing. When the photographic operating device is in the full-pressed position, the fill-light radiating device radiates the fill light to the subject, the re-ranging is achieved by the ranging device, and the focus-adjustment controlling device computes a focus adjusting position based on a result of the re-ranging, and the exposure is achieved by the exposure controlling device after the focus adjustment is controlled by the focus-adjustment controlling device based on the focus adjusting position.

The digital camera also includes a reliable determining mechanism for determining reliability based on the measured result of the ranging device. The reliable determining mechanism includes a program in the CPU. The focus-adjustment controlling device has a mechanism for computing a focus adjusting position based on the measured result of the ranging device. The mechanism for computing the focus adjusting position is composed of a program in the CPU.

Next, a structure and an operation of an electrical controlling system in the digital camera will be explained with reference to FIGS. 1 to 4.

A lens barrel unit 7 includes a zoom optical system 7-1 comprising a zoom lens 7-1a taking in an optical image of the subject and a zoom driving motor 7-1b, and a focus optical system 7-2 comprising a focus lens 7-2a and a focus driving motor 7-2b. The lens barrel unit 7 also includes an aperture stop unit 7-3 comprising an aperture stop 7-3a and an aperture stop motor 7-3b, a mechanical shutter unit 7-4 comprising a mechanical shutter 7-4a and a mechanical shutter motor 7-4b, and a motor driver 7-5 for driving each motor. The motor driver 7-5 is structured to control by a driving command from a CPU block 23c provided in a digital camera processor 24 which will be described hereinafter, based on an operational signal in which light received by a remote control light receiving part 6 is converted into an electrical signal, or an operational signal input in accordance with the operation of operating key units SW1 to SW13.

Here, the zoom optical system 7-1 and the focus optical system 7-2 correspond to the aforementioned lenses 14, the aperture stop unit 7-3 corresponds to the above-mentioned aperture stop 15, and the operating key units SW1 to SW 13 correspond to the photographic operating device.

Figure 4:
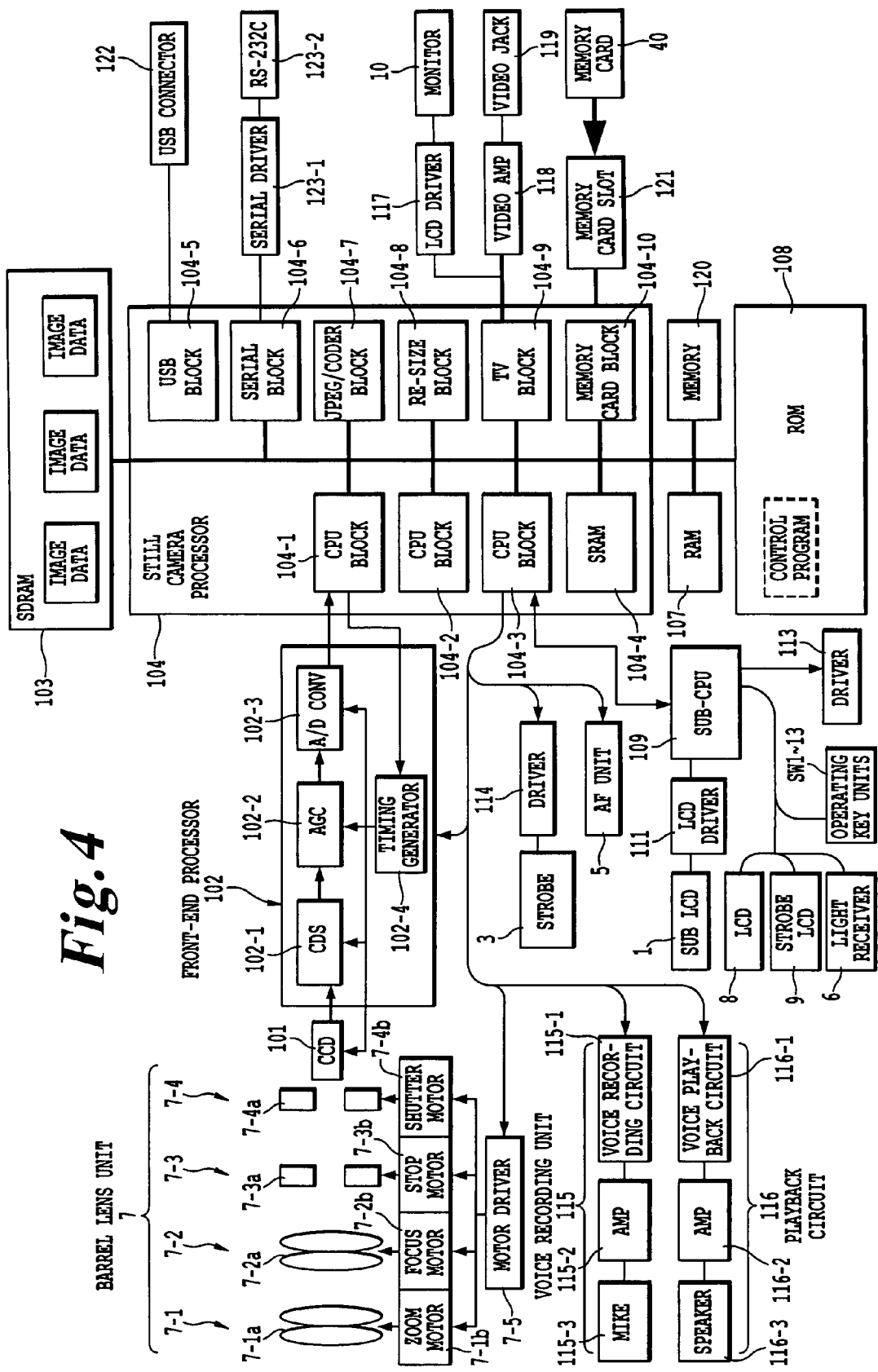
FIG. 4 is a block view showing an example of a controlling system of the digital camera including the imaging apparatus according to the present invention.

A controlling program and controlling parameters, which are written by readable codes in a CPU block 104-1 or CCD 1-signal processing block are stored in a Read Only Memory (hereinafter referred to as ROM) shown at 108 in FIG. 4. When a power source of the digital camera is turned on, the controlling program is loaded on a main memory (not shown), and the CPU block 104-1 controls operations of parts in the imaging apparatus in accordance with the programs thereof. Data and so on necessary to the control are stored temporarily in a local SRAM (static RAM) 104-4 provided in each of a Random Access Memory (hereinafter referred to as RAM) 107 and a digital still camera processor 104. Here, the SRAM means a RAM in which a holding operation is not required. If a re-writable flush ROM is used as the ROM 108, it is possible to change the controlling programs and the controlling parameters, there is an advantageous effect that version up of the functions is accomplished easily.

The ranging element mechanism 16 concretely includes a CCD (charge coupled device) 101, which comprise charge-storage type solid-state image sensors for conducing the optical image-photography conversion, an image signal which is imaged and converted into the electrical signal is adapted to input into an F/E (front-end)-IC 102. The F/E-IC 102 has a CDS 1021 for conducing a correlating double sampling for removing a noise of the image, an AGC (automatic gain control) 102-2 or conducting gain adjustment, and an A/D 102-3 for conducting a digital signal conversion. The F/E-IC 102 also includes a timing generator (hereinafter referred to as TG) 102-4, to which a vertical synchronous signal (hereinafter referred to as VD) and a horizontal synchronous signal (hereinafter referred to as HD) is supplied from the CPU block 104-1 included in the processor 104, and which generates a driving timing signal for the CCD 101 and the F/E-IC 102 controlled by a CPU block 104-3.

The digital still camera processor 104 executes a balance setting or gamma setting from the CCD 101 to output data of the F/E-IC 102, and has the CCD-signal processing block 104-1 for supplying the VD and HD signals. The processor 104-1 further includes a CCD 2-signal processing block 104-2 for conducting the conversion to brightness data and color different data by a filtering processing. In addition, the processor 104 has the CPU block 104-3 for conducting the operation of each part of the imaging apparatus, the local SRAM 104-4 for storing temporarily the data and so on required to the control, as described above, a USB block 104-5 for conducting communication with an exterior instrument such as a personal computer (hereinafter referred to as PC), and a serial block 104-6 for conducting serial communication with the PC and so on.

Moreover, the above-mentioned processor 104 includes a JPEG and CODEC block 104-7 for conducting compression and extension of a JPEG (joint photographic experts group), a re-size block 104-8 for conducting enlargement and reduction of a size of the image data by an interpolatiug process, a TV signal displaying block 104-9 for converting into a video signal to display the image data on an exterior display instrument such as a liquid crystal monitor, a TV or the like, and a memory card block 104-10 for conducting control of a memory card recording photographed image data.

The SDRAM 103 stores temporarily the image data when various processes are executed by means of the processor 104 based on the image data The stored image data are introduced through the F/E-IC 102 from the CCD 101, as one example, it is "RAM-RGB image data" in which white balance and gamma settings are executed by the CCD 1-signal processing block 104-1. Another example of the introduced data is "YUV image data" in which the brightness data/the color difference conversion is executed by the CCD 2-signal processing block 104-2, or "JPEG image data" compressed by the JPEG and CODEC block 104-7.

A memory card slot 121 is for inserting therein an attachable memory card 40. A built-in memory 120 is for storing the photographed image data even if the memory card 40 is not inserted in the memory card slot 121.

An LCD driver 117 is a driver circuit for driving the LCD monitor 10 which will be described hereinafter in detail, and has a function for converting the video signal output from the TV signal displaying block 104-9 into a signal for displaying on the LCD monitor 10. The LCD monitor 10 is one to use for various objects that monitors a state of the subject before photographing, confirms the photographed image, and displays the image data recorded in the memory card 40 and the built-in memory 120.

A video AMF 118 is an amplifier for converting the video signal output from the TV signal displaying block 104-9 included in the processor 104 into impedance of 75 Ω, a video jack 119 is for connecting with an exterior displaying instrument such as a TV. A USB connector 122 is for conducting a USB connection with an exterior instrument such as a personal computer and so on. A serial driver circuit 123-1 is a circuit for converting an output signal from the serial block into a voltage in order to conduct a serial communication with an external instrument such as a personal computer. An RS-232C connector 123-2 is for conducting a serial communication with an external instrument such as a personal computer and so on.

A sub CPU 109 is a CPU in which a ROM and RAM is loaded in one chip and which outputs a signal from the above-mentioned operating key its SW1 to SW13 or the remote controlling light-receiving part 6 to the CPU block 104-3 as operational information or a user, or outputs a state of the camera output from the CPU block 104-3 by converting the state into a control signal of the sub LCD 1, the AF and LCD 8, the strobe-LED 9 and a buzzer 27, which will be described hereinafter. The sub LCD 1 is a displaying part for displaying, for example, photograph possible numbers and so on, an LCD driver 111 is a driving circuit for driving the sub LCD 1 based on the output signal from the sub CPU 109. The AF and LED 8 is an LED for displaying a focused state when photographing, the strobe-LED 9 is an LED for displaying a charged state of a main condenser in the strobe. In addition, the AF and LED 8, and the strobe-LED 9 may be employed for the other displaying use such as memory card access and so on.

The operating key units SW1 to SW13 include a key circuit operated by the user, and the remote controlling light-receiving part 6 includes a receiving part for a signal of a remote controlling transmitter operated by the user. A voice recording unit 115 comprises a microphone 115-3 in which the user inputs a voice signal, a microphone amplifier 115-2 for amplifying the input voice signal, and a voice recording circuit 115-1 for recording the amplified voice signal. A voice playing-back unit 116 comprise a voice playing-back circuit 116-1 for converting the recorded voice signal into a signal capable of outputting from a speaker 116-3 which will be described hereinafter, an audio AMP 116-2 for amplifying the converted voice signal and driving the speaker, and the speaker 116-3 for output the voice signal.

Next, an imaging method or a ranging method according to the present invention in the digital camera as described above will be described below.

The ranging method has two modes including a first mode in which the release button SW1 is executed in the half-pressed position (method of performing the re-ranging before photographing), and a second mode in which the release button SW1 is executed in the full-pressed position (method of performing the re-ranging when photographing).

First, the ranging method in the half-pressed position of the release explained.

When the release is in the half-pressed position, the camera initiates a focusing. Here, as a process of the focusing, a command in which light is received is output from the digital still camera processor 104 to the exterior AF unit 5 (FIG. 2) by which a measured result is output. Thereafter, the focus optical system 7-2 is moved to a focus position corresponding to a distance to the subject, which is obtained based on the measured result. Because the embodiment according to the present invention relates to the light reception and the method of computing the ranging in the exterior AF unit 5, the exterior AF unit 5 and methods for computing the re-ranging and for determining the re-ranging by use of the exterior AF unit 5 will be explained.

A structure and an arithmetical method of the exterior AF unit 5 are first explained.

The exterior AF unit 5 contains charge-storage type light receiving sensors arranged rightward and leftward in line, for example, CCD line sensors. The light receiving sensors have a plurality of light receiving areas, and right and left light receiving areas are disposed to correspond with respect to each other. When a command of received light is transmitted from the exterior AF unit 5, the right and left light receiving sensors receive light in accordance with a charge-storage mode, which is an operational mode of the exterior AF unit 5. The charge-storage mode determines a light receiving system of the light receiving sensors in the exterior AF unit 6 and has an automatic storage mode and a forcing storage mode.

The automatic storage mode completes automatically if an amount of light, which is more than a fixed amount is detected even by one of the light receiving sensors. A lapsed time at this time is set as a charge-storage time.

Moreover, in case of the forcing storage mode, light reception is executed a predetermined charge-storage time. Usually, the charge storage mode is adapted to perform the light reception by an automatic integration mode. When the light reception is completed, a correlation between the right and left images of the subject in each area of the light receiving sensors is detected, and a deviated amount between the right and left light receiving elements is calculated based on a correlated value detected as described above. A distance to the subject is calculated by use of a triangular surveying method based the deviated amount to set the calculated distance. Consequently, each area has a mutually different ranging value or ranging data. Actually, a ranging value output from the exterior AF unit 5 toward the camera and the area thereof are decided by determining whether the ranging value in each area is near the rated value than that of the other areas, in the other words, effectiveness of sensor data received in the area is higher. The determination of the effectiveness of the sensor data is accomplished by whether the contrast of the light receiving data in each area, the difference between the images in the right and left sensors, and so on satisfy the rated value. However, if all the areas do not satisfy the rated value, an area having the highest effectiveness of the ranging values in the entire areas, or area closest to the rated value is selected.

Figure 5:
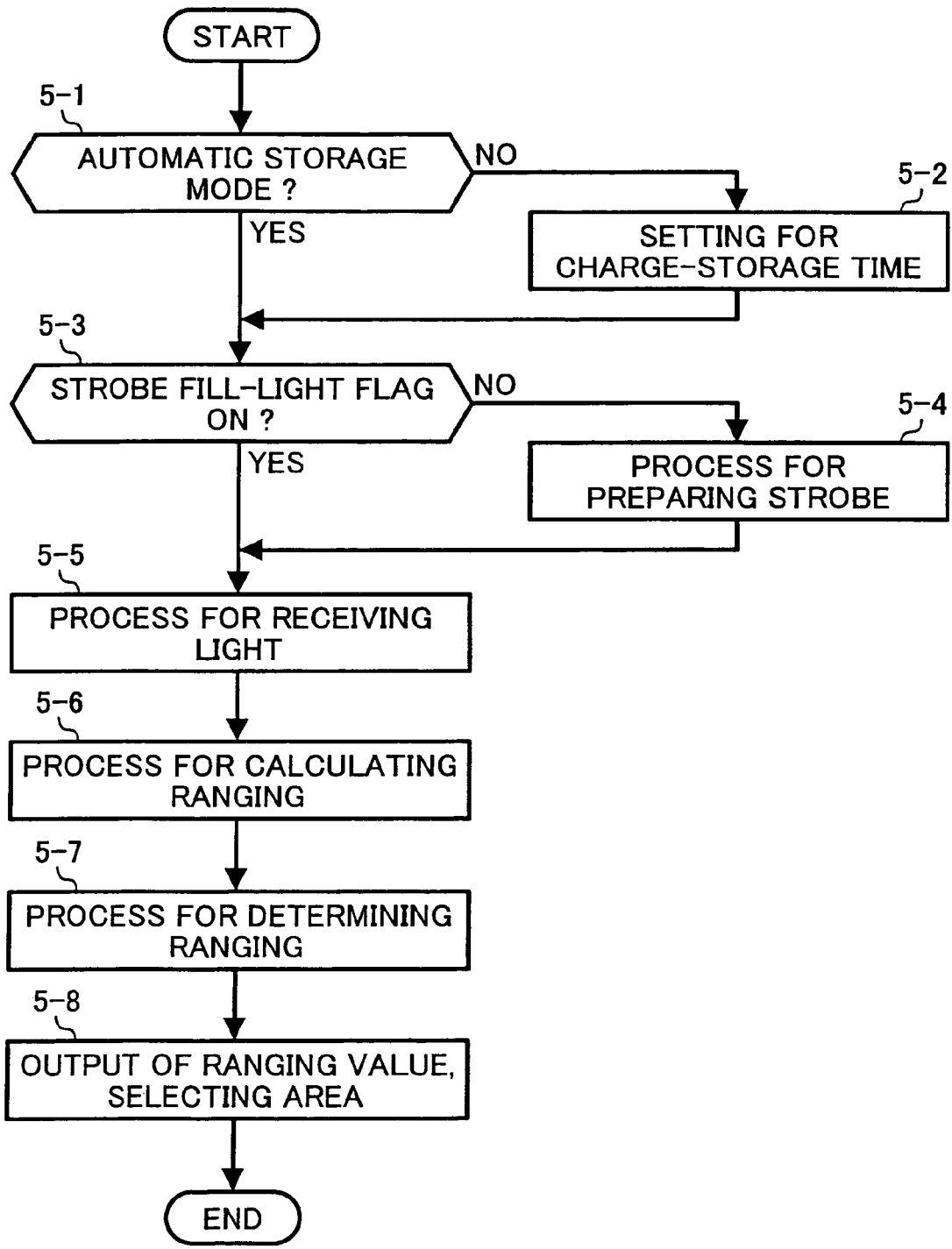
FIG. 5 is a flow chart showing a series of flows relating to an AF ranging in a ranging unit or device.

A flow chart shown in FIG. 5 shows the imaging method, in other words, the AF ranging method according to the present invention in which the structure and arithmetical method of the above-mentioned ranging apparatus or the exterior AF unit 5 are used. Regarding FIG. 5, the ranging is accomplished by using the structure and the arithmetical method of the exterior AF unit 5, and the results of a re-ranging arithmetical process (FIG. 6) and a re-ranging determining process (FIG. 7), in other words, deciding the charge-storage mode and turning on a strobe fill-light flag, which will be described hereinafter.

First, a series of flows shown in FIG. 5 are explained. In FIG. 5, steps of operation are shown as 5-1, 5-2 . . . , for example.

Whether the charge-storage mode is first the automatic storage mode is determined with respect to the light reception in the exterior AF unit (5-1). If so, the step is shifted to the next step (5-3). If not so, that is to say, if it is the automatic storage mode, the 5-1 step is shifted to the next step (5-3) through a process (5-2) for setting a charge-storage time. The setting of the charge-storage time is one set in the re-ranging determining process (FIG. 7) as described hereinafter. In the next step (5-3), whether the strobe fill-light flag is ON is determined. The strobe fill-light flag is decided by setting ON/OFF of the strobe fill-light flag in the re-ranging determining process (FIG. 7) as described hereinafter. If the strobe fill-light flag is in ON, a process (5-1) preparing the strobe so as to capable of emitting the strobe when receiving light is executed, if not so, a light reception process is executed.

Subsequently, the light flux of the subject is received in the charge-storage type light receiving elements by the light reception process (5-5). If the strobe fill-light flag is ON as a result of the determination in the step (5-3), light emission is carried out through a predetermined light emitting time during the light reception. Here, the predetermined light emitting time means a time necessary to obtain an amount of light emission that the strobe is capable of reaching to a degree of distance, for example, about 5 meters. The time is a fixed time, for example, 10 μs in the embodiment. However, because the setting of the light emitting time depends on performance of a strobe unit, the time may be changed. Next, a ranging arithmetical process is executed to calculate a ranging value (5-6), The arithmetical method is as described in the explanation of the structure and the arithmetical method of the exterior AF unit 5.

Next, a ranging determining process (5-7) is configured to output as a ranging value a distance in an area considered to be the highest effectiveness of ranging values in the areas calculated in the previous process, and the area selected at the present time is also output (5-8). The above is an explanation regarding the exterior AF ranging method showing in FIG. 5.

Next, the re-ranging arithmetical process will be explained in consideration of the above explanation made with reference to FIGS. 6, 14 to 16B.

A first ranging is first started (6-1). The first ranging is executed along the flows of the AF ranging method shown in FIG. 5. At the time of the first ranging, the charge-storage mode is set to the automatic storage mode, and the strobe fill-light flag is executed in ON. Next, the determination of effectiveness of the ranging value in the selected area is executed in the re-ranging determining process (6-2). The determination of effectiveness is performed by the re-ranging determining process or device, which will be described hereinafter in FIG. 7. In the re-ranging determining process, whether a re-ranging flag is ON is determined (6-3). If so, the process is shifted to a process (6-9) initiating a second ranging. If not so, a ranging value and area is selected by the first (6-9).

Next, if the shift to the process (6-4) initiating the second ranging is made, the second ranging is started. The second ranging is executed along the flows in the AF ranging as described above, at this time, the charge-storage mode, if the strobe fill-light flag is ON, is adapted to perform with the automatic integration mode, if not so, with the forcing storage mode. The charge-storage time in the forcing storage mode corresponds to a forcing charge-storage time obtained in the re-ranging determining process (FIG. 7) as described hereinafter. Next, a determination of the second ranging is executed based on a calculated result in the second ranging (6-5). In the process, evaluation of effectiveness with respect to the ranging value in the area selected in the second ranging is executed, and if the evaluation is effective or OK, the present process is shifted to the next process, if not so, the first ranging value and area is selected (6-9).

Figure 6:
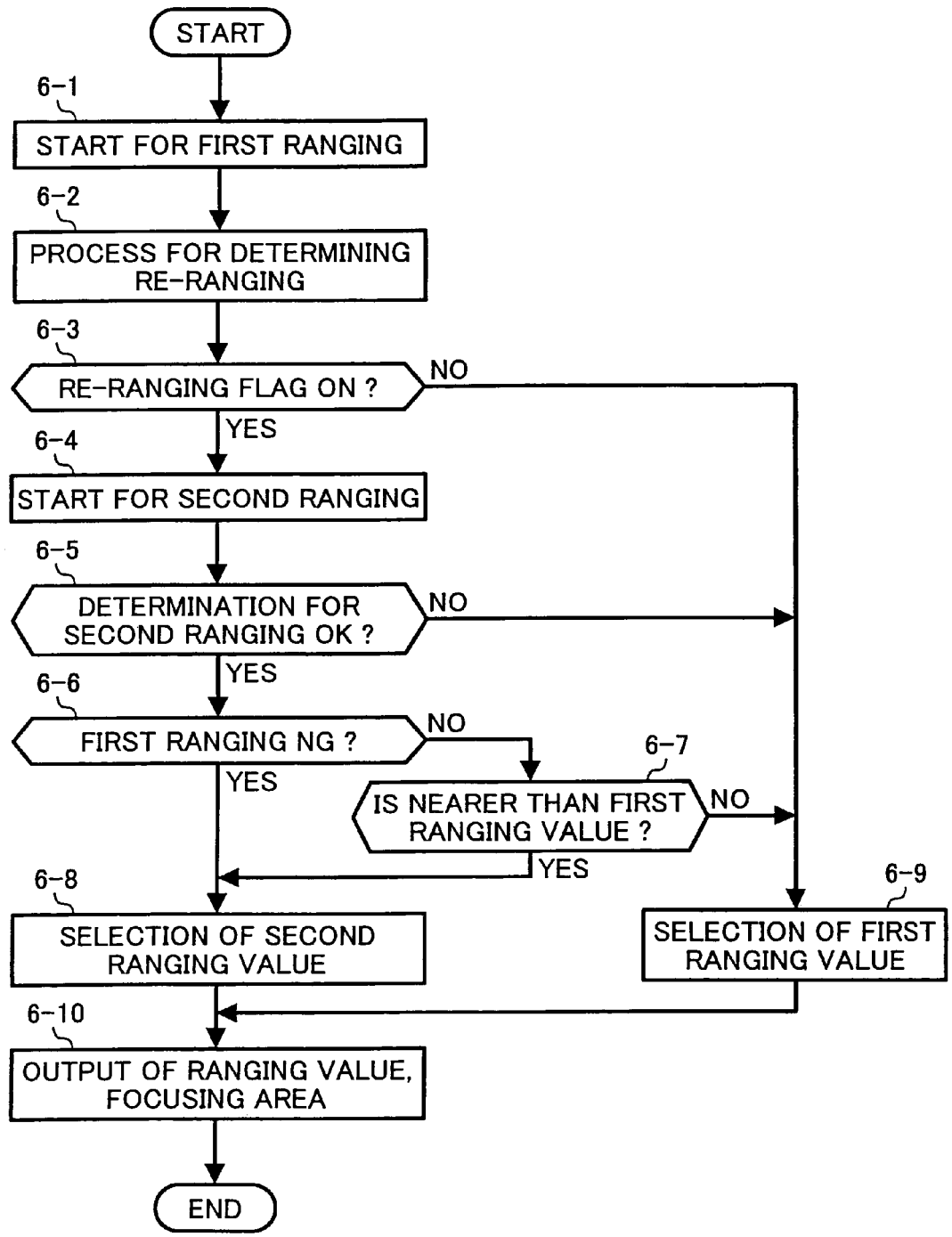
FIG. 6 is a flow chart for explaining an example of a flow of a re-ranging arithmetical process in a ranging method at the time of a half-pressed position of a release.

Next, whether the effectiveness of the ranging value in the area selected in the first ranging at the time of the second ranging is high is determined. If the effectiveness of the ranging value in the first ranging is low or NG, the second ranging and area is selected to set that as a final output. If not so, the second ranging value is compared with the first ranging value and then one ranging value and area of these ranging values, more near the rated value is selected. More specifically, if the second ranging value is near the rated value, the second ranging value and area is selected (6-8), if not so, the first ranging and area is selected (6-9). Finally, the selected ranging and area is output as the final ranging value and area (6-10). The above is the explanation regarding the re-ranging arithmetic as shown in FIG. 6.

Figure 7:
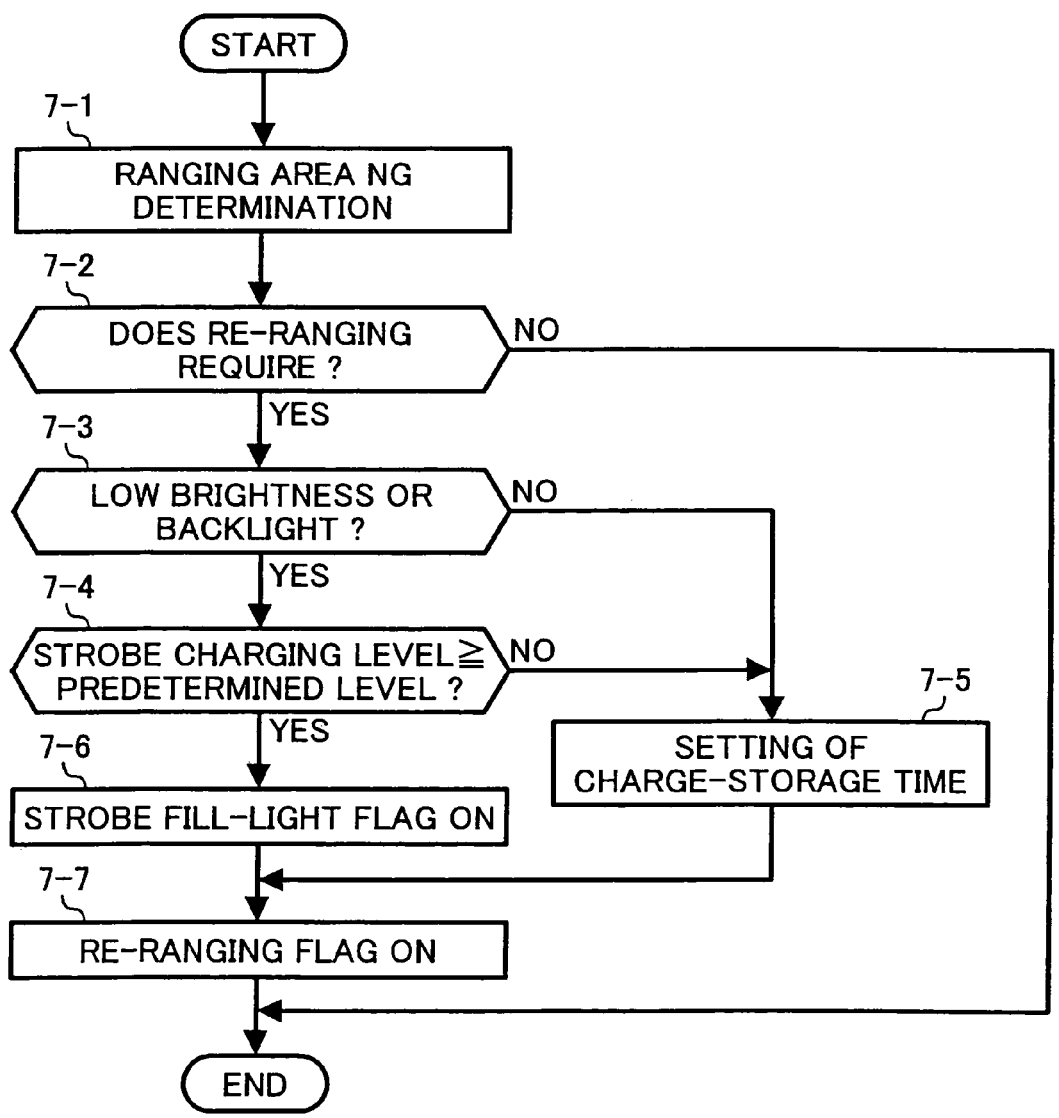
FIG. 7 is a flow chart for explaining an example of a flow of a re-ranging determination.

FIG. 7 is a flow chart showing a series of flows of the re-ranging determining process or device during the re-ranging arithmetic as described above.

The determination or NG determination of effectiveness of the ranging result is first performed (7-1). In the process, whether the ranging value in the selected area is near the rated value than that in the other areas is first determined. If not so, if a difference between the value in the selected area and the near ranging value is more than a fixed range, the re-ranging determining process determines that the re-ranging is required, and is shifted to the next process. If not so, the re-ranging determining process determines that the re-ranging is not required. Moreover, the ranging value in the selected area is near the rated value than that in the other areas, but if the ranging value in the selected area has a lower effectiveness or NG in the ranging determining process in flows of the AF ranging, the re-ranging determining process determines that the re-ranging is required and proceeds to the next process, if not so, it determines that the re-ranging is not required (7-2).

If the determination that the re-ranging is required is made in the above-mentioned step (7-2), whether the circumstance of the subject is a low brightness or backlight is determined (7-3). If so, the determination that the strobe fill-light is required is made and the 7-3 process is shifted to the next process. If not so, the 7-3 process is sifted to a process (7-6) for setting the charge-storage time. Here, the determination as to whether the circumstance is the low brightness or backlight is made by a magnification of sensor data from each area of the ranging unit 5 or use of a measured result in calculating an appropriate exposure when monitoring using the imaging elements of the digital camera. In the process (7-5) for setting the charge-storage time, if the ranging value of the selected area is not near the rated value than that of the other areas, the area having the near ranging value at this time is set as an area setting the charge-storage time, an optimum charge-storage time is set in the light receiving elements in this area. In addition, if the ranging value of the selected area is near the rated value than that in the other areas, but the ranging value is not effective or NG, the selected area at this time is set to an area for setting the charge-storage time, an optimum charge-storage time is set in the light receiving elements in this area. The function for setting the charge-storage time includes searching the minimum of the charge-storage times in the light receiving elements in the area for setting the charge-storage time, the first ranging, obtaining a proportion of the minimum and the maximum of the charge-storage times in all the light receiving elements, and multiplying the first charge-storage time by the proportion to set that value as a forcing charge-storage time. Here, if there are multiple minimum values, the forcing charge-storage time is set by selecting the most large value among the minimum values, obtaining a proportion of the most large value and the maximum value in all the light receiving elements, and multiplying the first charge-storage time by the proportion.

Next, in the step (7-3), if the determination is made, which is in the circumstance of the subject that the strobe fill-light is required, whether the charging level of the strobe fill-light is a predetermined level, that is to say, the level is possible to radiate the fill light by a predetermined light emitting time is determined (7-4), if it is more than the predetermined level, the strobe fill-light flag is set to be ON (7-6). If not so, the determination that the strobe fill-light cannot be emitted is made and the present process is shifted to the process (7-5) for setting the charge-storage time. In this embodiment, if the charge level of the strobe fill-light is not the predetermined level, that is to say, the level is not possible to radiate the fill light by the predetermined light emitting time, the shift to the process for setting the charge-storage time is made, but the strobe is charged until the charging level is more than the predetermined level, thereafter a structure may be taken such that strobe fill-light flag is ON. The above is a description of the re-ranging determining process as shown in FIG. 7.

As described above, the imaging method or ranging method, or a method for carrying out re-ranging before photographing in the half-pressed position of the release has been explained.

Next, the ranging method or a method for carrying the re-ranging when photographing, in the fill-pressed position of the release will be explained.

A series of flows regarding the AF method are the same as the ranging method in the half-pressed position of the release or the method for carrying out the re-ranging before the photographing.

Figure 8:
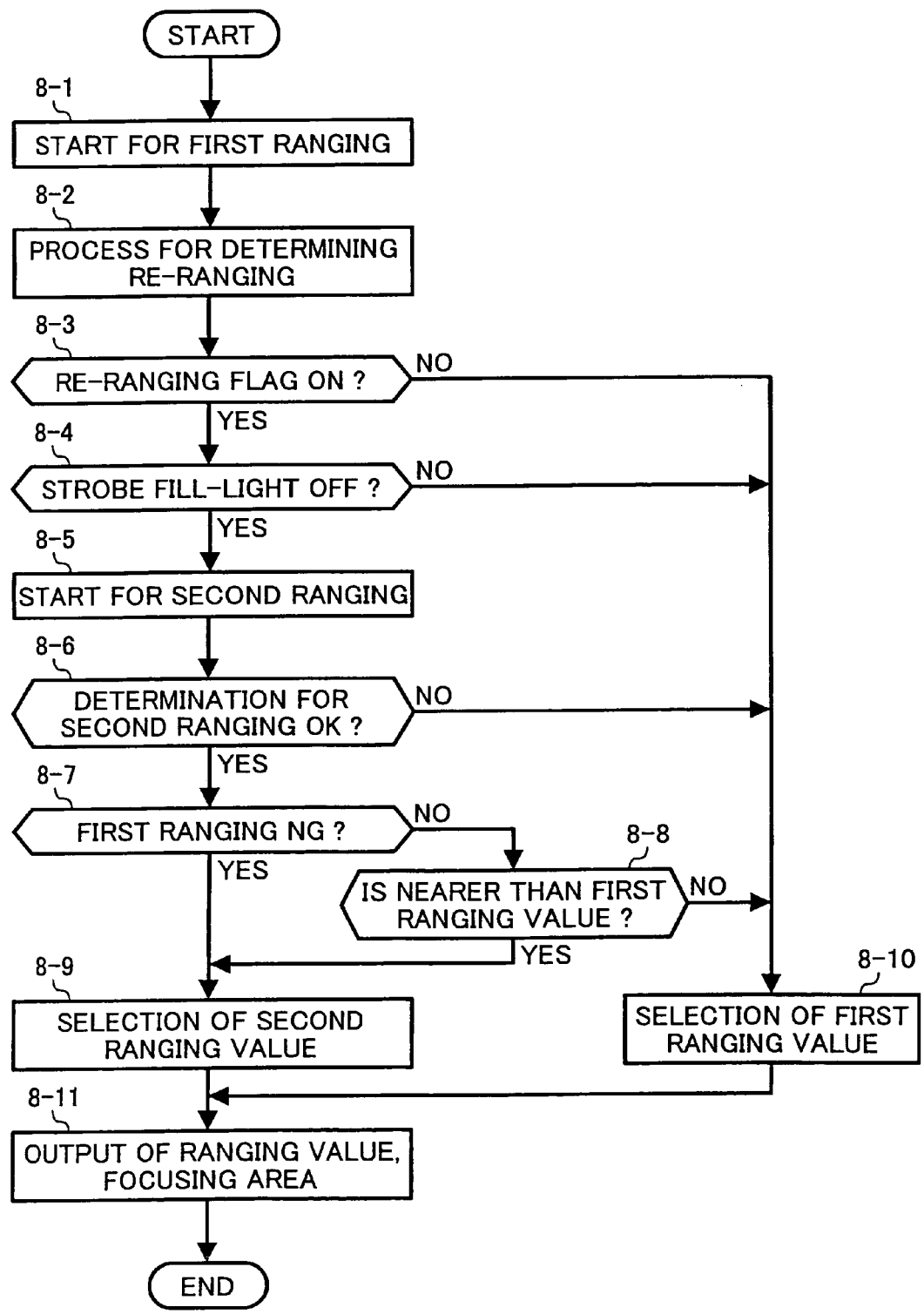
FIG. 8 is a flow chart showing an example of a re-ranging arithmetic in time of the half-pressed position of the release in a ranging method at the time of the full-pressed position of the release.

FIG. 8 shows a series of flows regarding the ranging in the half-pressed position of the release. This process is configured in consideration of a case pressing the release in two steps, that is to say, carrying out a photograph in the fill-pressed position of the release after the ranging is executed in the half-pressed position of the release. For example, if the release button is fill-pressed at once, after the process in the half-pressed position of the release is executed as shown in FIG. 8, the process in the fill-pressed position of the release is continuously executed as described hereinafter in FIG. 9. The first ranging is first initiated (8-1). This is carried out by use of the AF ranging method as shown in FIG. 5, the automatic integration mode, and the strobe fill-light in a state of OFF. Next, the determination as to whether the re-ranging is required about a result of the first ranging is made (8-2). The re-ranging determining process is the same as that in the half-pressed position of the release as shown in FIG. 7.

Next, the determination as to whether the re-ranging flag is ON is made by use of the re-ranging determining process (8-3). If the re-ranging flag is ON, the process is shifted to the next step (8-4), if not so, the ranging value and area by the first ranging is selected (8-10). In the above-mentioned step (8-4), whether the strobe fill-light flag is OFF is determined (8-4). If the strobe fill-light flag is OFF, the process is shifted to a process (8-5) for initiating the second ranging, if not so, the ranging value and area by the first ranging is selected (8-10). In the process (8-5) for initiating the second ranging, the second ranging is executed along the flows of the AF ranging. The charge-storage mode at this time becomes the forcing storage mode, because the strobe fill-light flag is usually OFF. The charge-storage time at the time of the forcing storage mode corresponds to the forcing charge-storage time obtained in the re-ranging determining process.

Next, the determination for the second ranging is executed (8-6). In the second ranging, the effectiveness of the ranging value is evaluated. If the evaluated result has a high effectiveness (OK), the present process is shifted to the next process, if not so, the first ranging value and area is selected (8-10). In the second ranging, the effectiveness of the ranging value in the area selected in the first ranging is determined (8-7). If the effectiveness is low (NG), the ranging value and area by the second ranging is selected (8-9), if not so, the first and second ranging values are compared, one of them near the rated value is selected (8-8). More specifically, if the second ranging value is near the rated value, the second ranging value and area is selected (8-9), if not so, the ranging value and area in the first ranging is selected (8-10). Finally, the selected ranging and area is output as the final ranging value and area (8-11). Moreover, the result at this time is stored until the release is full-pressed subsequently, the stored result is deleted when the release is released without the release being full-pressed. In other words, if the ranging result is deleted, thereafter, the release is half-pressed, a process is configured to initiate from the first flow in FIG. 8. The above is a description of the process in the half-pressed position of the release.

Figure 9:
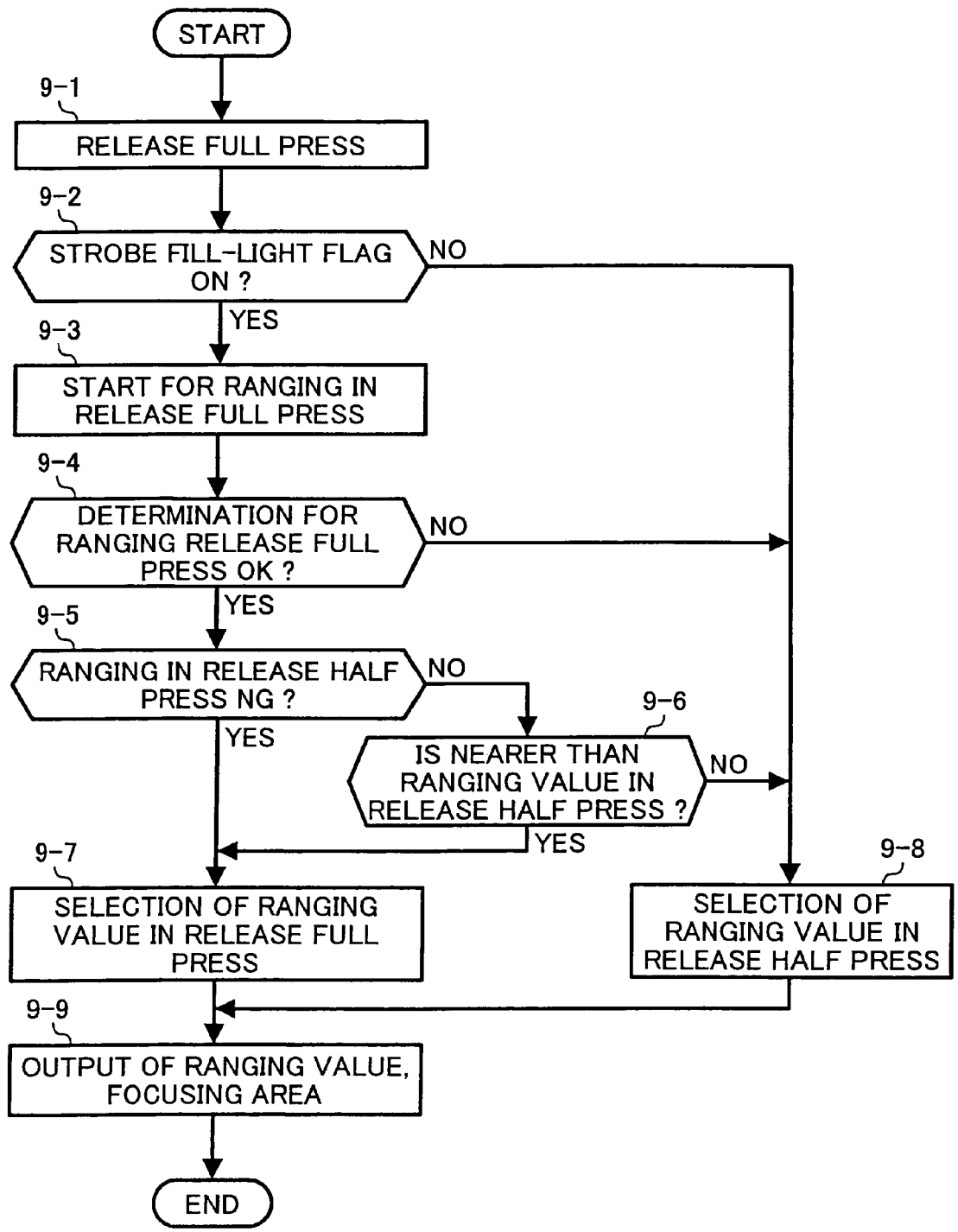
FIG. 9 is a flow chart showing an example of the re-ranging arithmetic in time of the full-pressed position of the release in the ranging method at the time of the full-pressed position of the release.

FIG. 9 is a flow chart showing a re-ranging arithmetic in the full-pressed position of the release.

When the release is fill-pressed (9-1), whether the strobe fill-light flag is ON is determined by the result of the re-ranging determining process shown in FIG. 8 (9-2). If the strobe fill-light flag is ON, the ranging in the full-pressed position of the release is initiated, if not so, the ranging result in the half-pressed position is selected (9-8). Next, the ranging in the full-pressed position of the release is initiated (9-3). In the ranging in the full-pressed position of the release, a process is made along the flows of the AF ranging, the charge-storage mode at this time is carried by the automatic integration mode because the strobe fill-light flag is ON. Next, the determination of the ranging in the full-pressed position of the release executed (9-4). In the process, the effectiveness of the ranging value is evaluated in the ranging in the full-pressed position of the release, if the evaluated result is effective (OK), the process is sifted to the next step (9-5), if not so, the ranging value and area in the half-pressed position of the release is selected (9-8).

In the above-mentioned step (9-5), whether the ranging result in the half-pressed position of the release is NG is determined. If the ranging result in the half-pressed position of the release is NG, the ranging value and area in the full-pressed position of the release is selected (9-7), if not so, the ranging values in the half-pressed and full-pressed positions of the release are compared (9-6), one of them more near the rated value is selected. More specifically, if the ranging value in the full-pressed position of the release is near the rated value, the ranging value in the full-pressed position of the release is selected (9-7), if not so, the ranging value and area in the ranging in the half-pressed position of the release is selected (9-8). Finally, the selected ranging value and area is output as the final ranging value and area (9-9). The above is the ranging method in the full-pressed position of the release or method for carrying out the re-ranging when photographing.

In the embodiments as described above, as the fill-light radiating device as needed when detecting the focusing, the strobe light emitter which emits light in synchronization with the photograph is employed, but the fill-light radiating device may be an LED, a filament type lamp which is usually used or the other lamp.

Next, a process in a usual mode of the camera in a second embodiment of the present invention will be described.

Figure 10B:
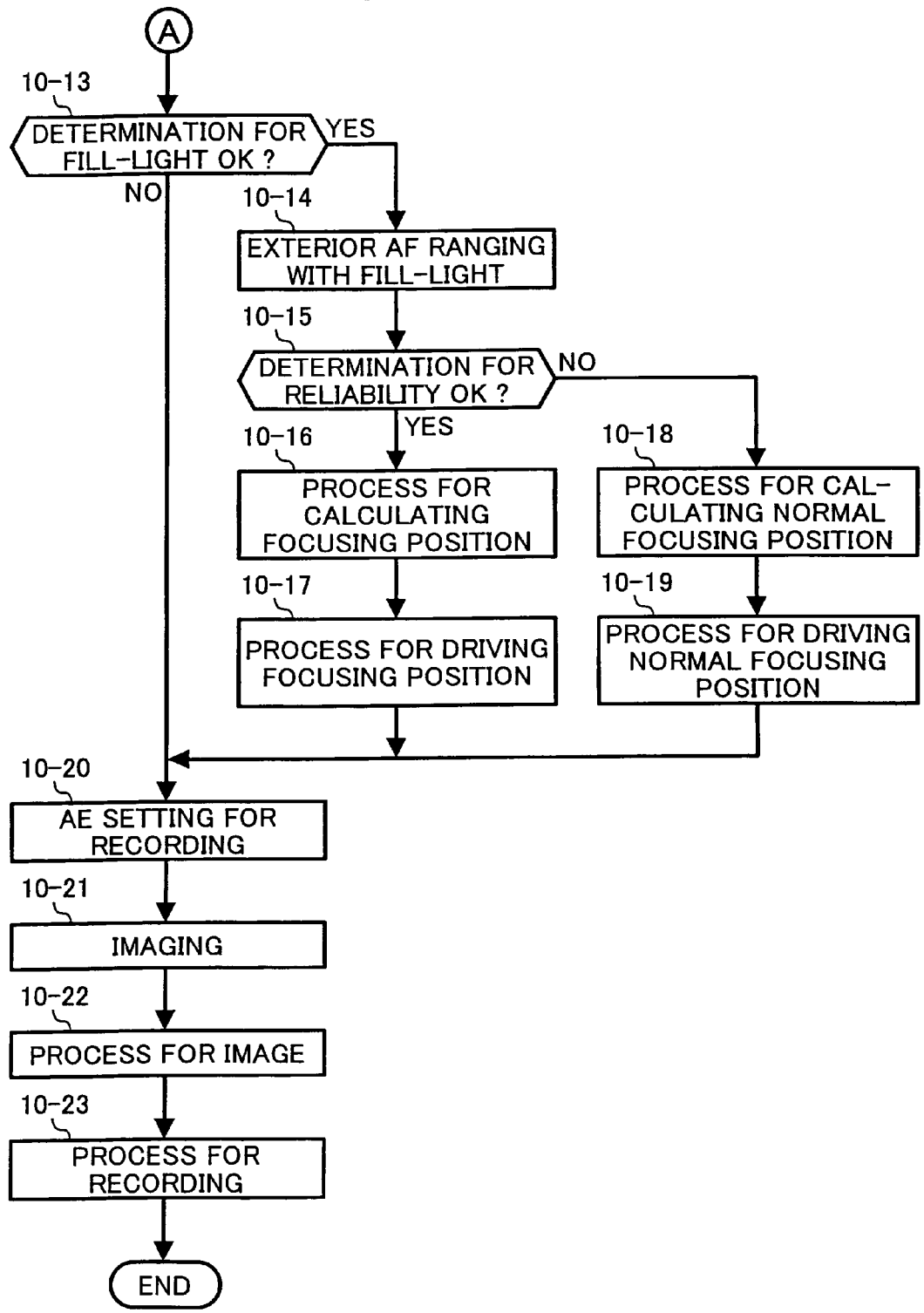
FIG. 10 is a flow chart showing an imaging process at the time of a usual mode.

As shown in a flow chart in FIG. 10, in the usual mode, an exterior AF ranging without fill-light is executed (10-2, 10-3). The exterior AF ranging is as shown in FIG. 5. Subsequently, the re-ranging determination is executed (10-5, referring to FIG. 6), if the determination that the re-ranging is not required is made, an amount of focus-drawing out is calculated based on the distance value which is the ranging result of the exterior AF (10-5), the focusing is controlled into the calculated focus-drawing out position (10-6). If the determination that the re-ranging is required is made in the re-ranging determination (10-5), then the determination as to whether the fill-light is required is executed (10-7). If the determination that the fill-light is not required is made, the re-ranging is again executed without the fill light.

The setting of the charge-storage time of the exterior AF at the present time corresponds to the time obtained in the re-ranging determining process (FIGS. 6 and 7) based on the first ranging result. If the determination that the ranging result is OK is made in a reliable determination for the ranging result, the amount of focus-drawing out is calculated from the distance value by the re-ranging to control the focusing (10-5, 10-6). In the reliable determination, if the determination that the ranging result is NG is made, a normal focusing position corresponding to each zoom position is calculated (10-10), the focus lens is moved into the normal focusing position (10-11). In the fill-light determination, if the determination that the fill-light is required is made, the release is in a state of waiting the fill-press without the re-ranging, the arithmetic of the amount of drawing out, and the drawing out driving (10-12).

When the fill-press of the release is detected, the fill-light determination is executed (10-13), if the determination that the fill-light is not required is made in the half-pressed position, an AF setting for recording, an imaging, an image processing and a recording process to the card, and a series of recording processes are executed (10-20 to 10-23), as is. If the determination that the fill-light is required is made in the fill-light determination when the release is half-pressed, the exterior AF ranging is executed with the fill-light (10-14). In the exterior AF ranging at this time, the ranging operation is made in a synchronized state so that the strobe is emitted with a low brightness during integration.

In the reliable determination for the re-ranging result (10-15), if it is OK, the amount of focus drawing out is calculated from the distance value by the re ranging with the fill-light to control the focusing (10-16, 10-17). In the reliable determination, if the determination that the re-ranging result is NG is made, the normal focusing position corresponding to each zoom position is calculated (10-18), the focus lens is moved into the normal focusing position (10-19). After the completion of the drawing out, the AF setting for recording, the imaging, the image processing and the recording process to the card, and the series of recording processes are executed (10-20 to 10-23).

Next, a process in a self-mode of the camera in the second embodiment will be explained.

Figure 11B:
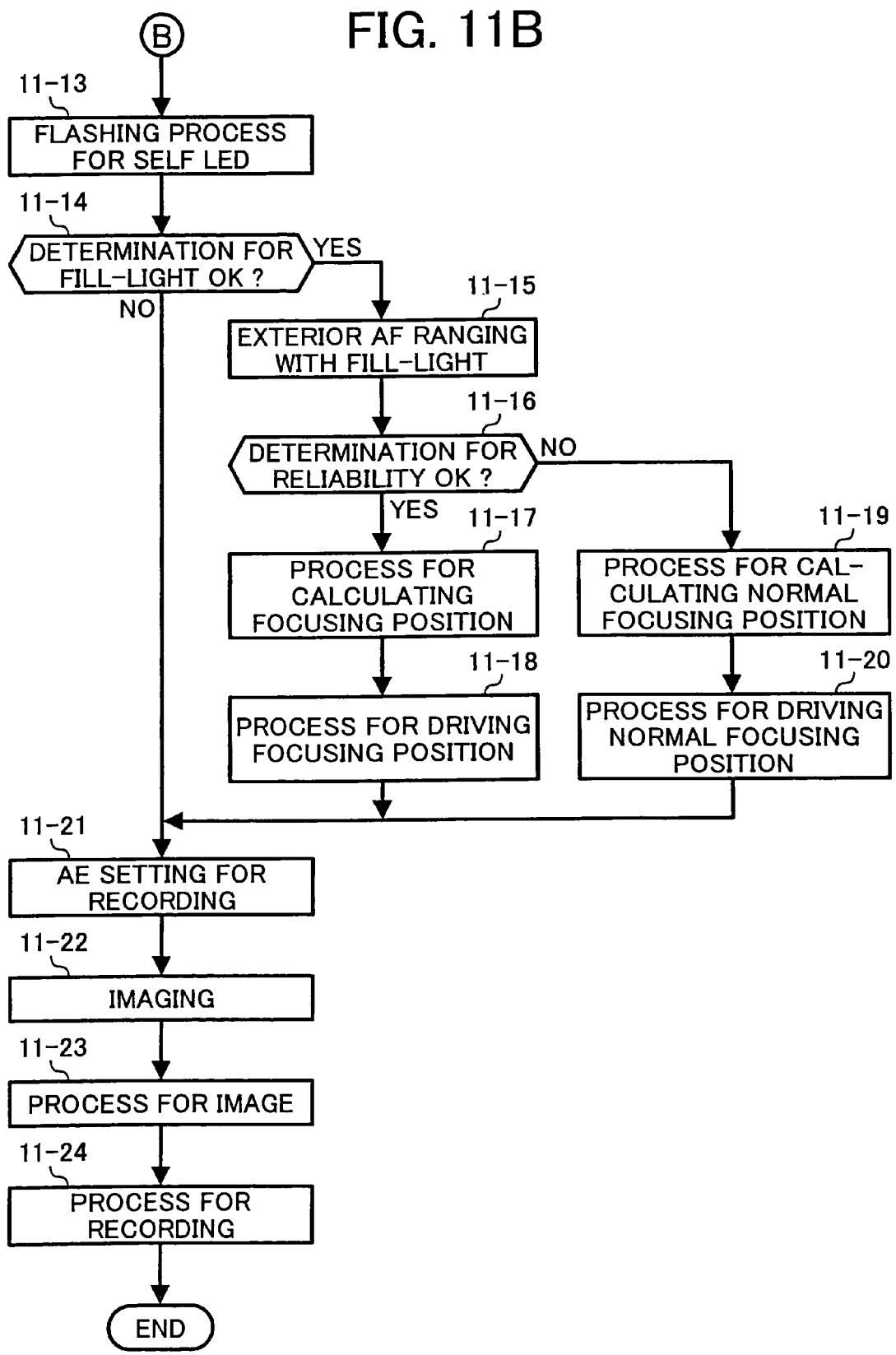
FIG. 11 is a flow chart showing an imaging process at the time of a self-mode.

As shown in a flow chart in FIG. 11, when the half-press of the release is detected in a photograph in the self-mode (11-1), the exterior AF ranging (11-2, 11-3) without measuring light, and the fill-light is executed. The exterior AF ranging is shown in FIG. 5. Next, the re-ranging determination (11-5, see FIG. 6 specifically) is executed, if the determination that the re-ranging is not required is made, the focus-drawing out amount is calculated from the distance value which is the ranging result of the exterior AF (11-5), and the focusing is controlled to move to a focus drawing out position calculated (11-6). In the re-ranging determination (10-5), if the determination that the re-ranging is required is made, then the determination as to whether the fill-light is required is executed (11-7). If the determination that the fill-light is not required is made, the re-ranging is again executed without the fill-light.

The charge-storage time of the exterior AF at this time corresponds to the time obtained in the re-ranging determining process (FIGS. 6 and 7) based on the first ranging result. In the reliable determination for the ranging result, if the determination that the ranging result is OK is made, the focus drawing out amount is calculated from the distance value by the re-ranging, to control the focusing with the calculated value (11-5, 116). If the determination that the ranging result is NG is made in the reliable determination, the normal focusing position corresponding to each zoom position is calculated (11-10), and the focus lens is moved into the normal focusing position (11-11). If the determination that the fill-light is required is made in the fill-light determination, the re-ranging, the release is in a state of waiting the fill-press without the arithmetic of the drawing out amount, and the drawing out driving (11-12).

When the fill-press of the release is detected, the step becomes a flashing process of the self-LED (11-13). After the LED is lighted 8 seconds and flashed 2 seconds, the fill-light determination is executed by means of the fill-light determining device (11-14). If the determination that the fill-light is not required is made in the half-press of the release, an AF setting for recording, an imaging, an image processing and a recording process to the card, and a series of recording processes are executed (11-21 to 11-24), as is. If the determination that the fill-light is required is made in the half-press of the release, in the fill-light determination, the exterior AF ranging with the fill-light is executed (11-15). In the exterior AF ranging at this time, the ranging operation is performed in a synchronized state so that the strobe is emitted with a low brightness during the integration.

If the determination that the re-ranging result is OK is made in the reliable determination for the re-ranging result (11-16), the focus drawing out amount is calculated from the distance value by the re-ranging with the fill-light to control the focusing (11-17, 11-18). If the determination that the re-ranging is NG is made in the reliable determination, the normal focusing position corresponding to each zoom position is calculated (11-19), and the focus lens is moved to the normal focusing position (11-20). After the completion of the drawing out, the AF setting for recording, the imaging, the image processing and the recording process to the card, and the series of recording processes are executed (11-21 to 11-24).

In the above-mentioned embodiments, although the strobe has been used as the fill light, an LED, lamp or the like may be used. Although the passive type exterior AF has been used as an AF system, an active system, passive system by TTL, or CCD-AF system may be applied.

According to the present invention, the effectiveness of the first ranging can be determined even in circumstances in which the brightness difference between the subject and background is large as in the subject having a low brightness, and in backlight, thereby an erroneous focusing occurs. Even if the ranging is not effective, if there are circumstances capable of emitting fill-light such as strobe, it is possible to emit the fill-light. Otherwise, after the charge-storage time of the light receiving elements is reset, the re-ranging is executed to be possible to output the ranging value by comparing the first and second ranging values, thereby accuracy of the ranging can be increased.

If the determination that the fill-light is required is made in the half-press of the release, because the re-ranging by the fill-light in the half-press and the focusing operation thereof are stopped, and the re-ranging by the fill-light in the full-press and the focusing operation thereof are executed, an uncomfortable feeling when emitting light in the half-press, that is to say, a misunderstanding that is photographed is resolved, and because ineffectual emission of light in the half-press is prevented, there is an advantageous effect that a buttery has a long operating life.

In the above-mentioned embodiments, although the imaging apparatus and the imaging method according to the present invention are applied to a digital camera, the present invention is not limited to the embodiments, is applicable to an auto-focus (AF) adjusting device in various cameras, for example, a silver salt camera, a video camera, a camera which is installed in a mobile phone, and the other various cameras. The present invention is applicable to various instruments such as a copying machine, a mobile phone or the like without being limited to the camera.

Although the preferred embodiments of the present invention have been described, the present invention is not limited to the embodiments, various changes and modifications can be made to the embodiments.

What is claimed is:

1. An imaging apparatus, comprising:
   a photographic operating device including at least two-step operational positions having a half-pressed position and a full-pressed position;
   a ranging device to measure a distance to a subject;
   a fill-light radiating device to radiate fill light to the subject;
   a fill-light determining device to determine whether the fill light is required;
   a re-ranging determining device to determine whether a re-ranging is required to be executed based on a measured result of the ranging device; and
   a processor connecting to the photographic operating device, the ranging device, the fill-light radiating device, the fill-light determining device, and the re-ranging determining device,
   wherein
   when the photographic operating device is in the half-pressed position, in case that the re-ranging determining device determines that the re-ranging is required and the fill-light determining device determines that the fill light is required, the processor controls to allow the photographic operating device to wait for being in the full-pressed position, and controls the fill-light radiating device to radiate the fill-light, and the ranging device to perform the re-ranging when the photographic operating device is in the full-pressed position.

2. The imaging apparatus according to claim 1,
   wherein the ranging device includes a ranging element mechanism to allow a light flux from the subject to image on the ranging element mechanism to measure the distance to the subject,
   a ranging arithmetical mechanism to achieve an arithmetic of the ranging based on outputting data of the ranging element mechanism and
   an area selecting mechanism to select an area based on an arithmetical result of the ranging arithmetical mechanism.

3. The imaging apparatus according to claim 2,
   wherein the ranging element mechanism includes at least a pair of light receiving sensors, each of which has a plurality of light receiving areas, which are charge storage type and capable of imaging light flux from the subject.

4. The imaging apparatus according to claim 3,
   wherein the re-ranging determining device has a light measuring function to measure a light amount in an ambience of the subject;
   the fill-light radiating device determines whether the ambience of the subject is in a predetermined state in the light measuring function; and if the ambience is in the predetermined state, the fill-light radiating device radiates the fill-light to the subject during a charge-storage of the ranging element mechanism when achieving the re-ranging.

5. The imaging apparatus according to claim 4, further comprising
   a mechanism to set a charge storage time in the light receiving area of the charge storage type, when the re-ranging determining device determines that the re-ranging is required and the ambience of the subject is not a predetermined state at the time of the re-ranging.

6. The imaging apparatus according to claim 5, wherein the predetermined state is an ambience of backlight or a low brightness.

7. The imaging apparatus according to claim 2,
   wherein the re-ranging determining device determines whether the re-ranging is required in comparison a ranging arithmetical result of an area selected by the area selecting mechanism with a ranging arithmetical result of another area.

8. The imaging apparatus according to claim 7,
   wherein the re-ranging determining device determines whether the area selected by the area selecting mechanism is nearer a rated value than the other area; and if the selected area is nearer the rated value than the other area, the re-ranging determining device determines that re-ranging is not required, and if the selected area is not nearer the rated value than the other area, determines that the re-ranging is required.

9. The imaging apparatus according to claim 2, wherein the re-ranging determining device determines the re-ranging is required, if all the areas are not effective in a result of arithmetic by the ranging arithmetical mechanism.

10. The imaging apparatus according to claim 2, wherein when the re-ranging determined by the re-ranging determining device is achieved, a first measured result and a second measured result are compared, ant a more effective measured result is output.

11. The imaging apparatus according to claim 1, wherein the fill-light radiating device includes a strobe.

12. The imaging apparatus according to claim 11, wherein the re-ranging is achieved without emitting light if a charging level of the strobe does not reach to a predetermined level.

13. The imaging apparatus according to claim 11, wherein the re-ranging is achieved after charging if a charging level of the strobe does not reach to a predetermined level.

14. The imaging apparatus according to claim 1, wherein the fill-light radiating device includes an LED.

15. The imaging apparatus according to claim 1, wherein the fill-light radiating device includes a lamp.

16. The imaging apparatus according to claim 1, further comprising:
a focus-adjustment controlling device to control adjustment of a focus based on a measured result of the ranging device; and
an exposure controlling device to control an exposure, wherein
when the photographic operating device is in the half-pressed position and the fill-light determining device determines that the fill light is required,
the processor controls to allow the focus-adjustment controlling device not to do an adjustment of focusing, and when the photographic operating device is in the full-pressed position, the focus-adjustment controlling device to compute a focus adjusting position based on a result of the re-ranging, and controls to allow the exposure to be achieved by the exposure controlling device after the focus adjustment is controlled by the focus-adjustment controlling device based on the focus adjusting position.

17. The imaging apparatus according to claim 16, further comprising
a reliable determining mechanism to determine a reliability based on the measure result of the ranging device.

18. The imaging apparatus according to claim 16, wherein
the focus-adjustment controlling device includes an arithmetical mechanism to compute the focus adjusting position based on the measured result of the ranging device.

19. The imaging apparatus according to claim 16, wherein the fill-light determining device determines that the fill light is required if the reliable determining mechanism determines that the reliability is lower.

20. The imaging apparatus according to claim 16, wherein the fill-light determining device determines that the fill light is required if the ambient of the subject is a lower brightness.

21. The imaging apparatus according to claim 16, wherein the fill-light determining device determines that the fill light is required if the ambient of the subject is a state of backlight.

22. The imaging apparatus according to claim 16, wherein
when the reliable determining device determines that the reliability is lower based on a measured result, which is measured by the ranging device by radiating the fill-light at the time of the full-pressed position of the photographic operating device, the focus-adjustment controlling device conducts a focus adjusting control by setting the focus adjusting position to a fixed position.

23. The imaging apparatus according to claim 22, wherein the fixed position is a position of usual focal length.

24. A method for imaging a subject, comprising the steps of:
a photographic operating process including at least two-step operations having a half-pressed operation and a full-pressed operation;
a ranging process to measure a distance to a subject;
a fill-light radiating process to radiate fill light to the subject;
a fill-light determining process to determine whether the fill light is required;
a re-ranging determining process to determine whether a re-ranging is required to be executed based on a measured result of the ranging process; and
a control process to control the photographic operating process, the ranging process, the fill-light radiating process, the fill-light determining process, and the re-ranging determining process,
wherein
when the photographic operating process is in the half-pressed operation, in case that the re-ranging determining process determines that the re-ranging is required and the fill-light determining process determines that the fill light is required, the control process controls to allow the photographic operating process to wait for being in the full-pressed operation, and controls the fill-light radiating process to radiate the fill-light, and the ranging process to perform the re-ranging when the photographic operating process is in the full-pressed operation.

25. The imaging method according to claim 24, wherein:
the ranging process includes
a process to store charge to image a light flux from the subject on at least a pair of charge-storage type light receiving element arrays capable of setting a plurality of areas,
a process to achieve a ranging arithmetic based on an output of each area of the light receiving element arrays, and
a process to select an area based on a measured result by the ranging arithmetic process;
the re-ranging determining process determines whether a re-ranging is required by comparing a ranging arithmetical result of the area selected by the area selecting process with each ranging arithmetical result of the other areas; and
the fill light is radiated to the subject by the fill light radiating process, during storing the charge in the charge storing process, when it is determined that the re-ranging is required in the re-ranging determining process and when achieving the re-ranging.

26. The imaging method according to claim 25, wherein
the re-ranging determining process determines whether the area selected in the area selecting process is near a rated value than the other areas, determines, if so, that a measured result by the ranging arithmetical process is effective, and determines, if not so, that the re-ranging is required.

27. The imaging method according to claim 25, wherein
the re-ranging determining process determines that the re-ranging is required if all the areas are not effective as a result of the arithmetic in the ranging arithmetical process.

28. The imaging method according to claim 25, wherein
the re-ranging determining process includes a photometry process to measure an amount of light in the ambience of the subject, and the fill light radiating process determines whether the ambience of the subject is a predetermined state in the photometry process, and if so, radiates the fill light to the subject during storing the charge in the charge storing process when achieving the re-ranging.

29. The imaging method according to claim 16, further comprising
a process to set a charge-storage time in the light receiving element arrays, when the re-ranging is determined as a result of the determination by the re-ranging determining process, and the ambience of the subject is not the predetermined state.

30. The imaging method according to claim 16, wherein
the predetermined state is an ambience of backlight or a low brightness.

31. The imaging method according to claim 25, wherein
when the re-ranging determined by the re-ranging determining process is achieved, a first measured result and a second measured result are compared, ant a more effective measured result is output.

32. The imaging method according to claim 25, wherein the fill-light radiating process radiates light by a strobe.

33. The imaging method according to claim 25, wherein the fill-light radiating process radiates light by an LED.

34. The imaging method according to claim 25, wherein the fill-light radiating process radiates light by a lamp.

35. The imaging method according to claim 25, wherein
the fill-light radiating process achieves the re-ranging without emitting light of the strobe if a charging level of the strobe does not reach to a predetermined level.

36. The imaging apparatus according to claim 25, wherein the fill-light radiating process achieves the re-ranging after charging a main condenser of the strobe, if a charging level of the main condenser of the strobe does not reach to a predetermined level.

* * * * *